Figure 2A:
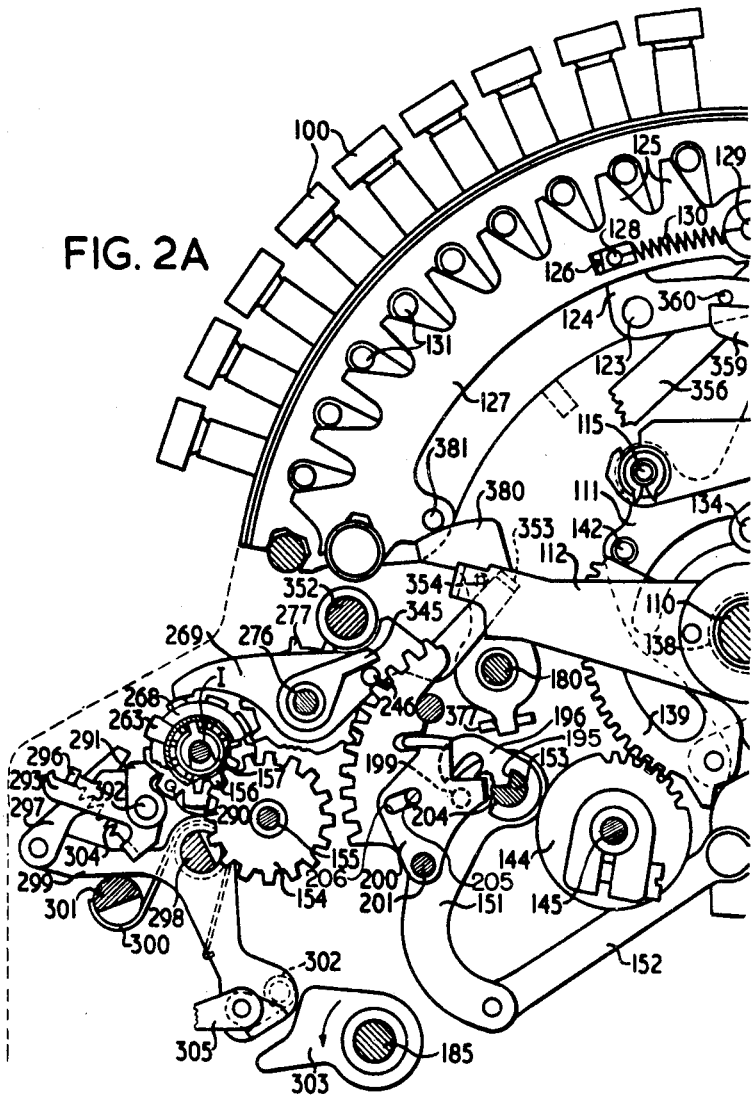

Aug. 21, 1962     G. HAPP     3,050,245
TOTALIZER ENGAGING CONTROLS
Filed April 15, 1958     13 Sheets-Sheet 1
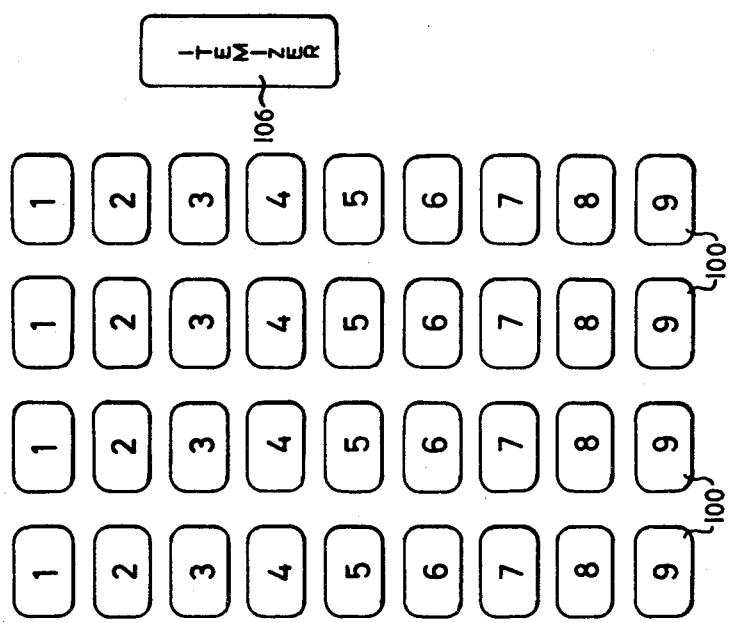
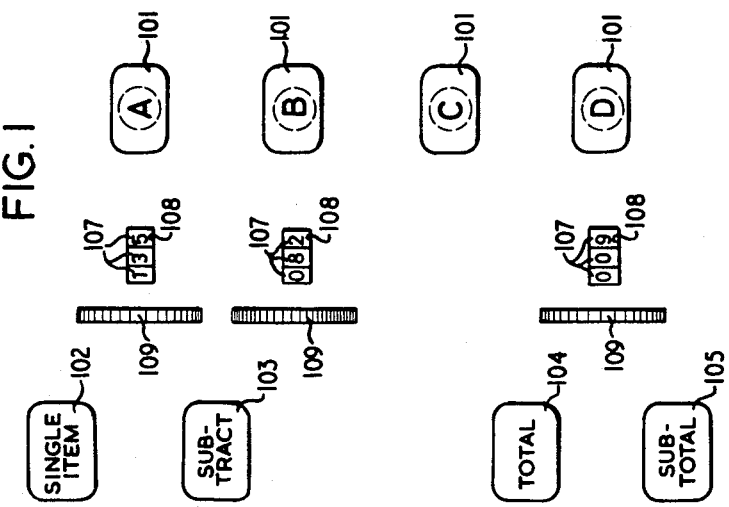
FIG. 1
INVENTOR
GEORG HAPP
BY
HIS ATTORNEYS

INVENTOR
GEORG HAPP

BY
HIS ATTORNEYS

Aug. 21, 1962 G. HAPP 3,050,245
TOTALIZER ENGAGING CONTROLS
Filed April 15, 1958 13 Sheets-Sheet 4

INVENTOR
GEORG HAPP
BY Louis A. Kline
Wilbert Hawk, Jr.
HIS ATTORNEYS

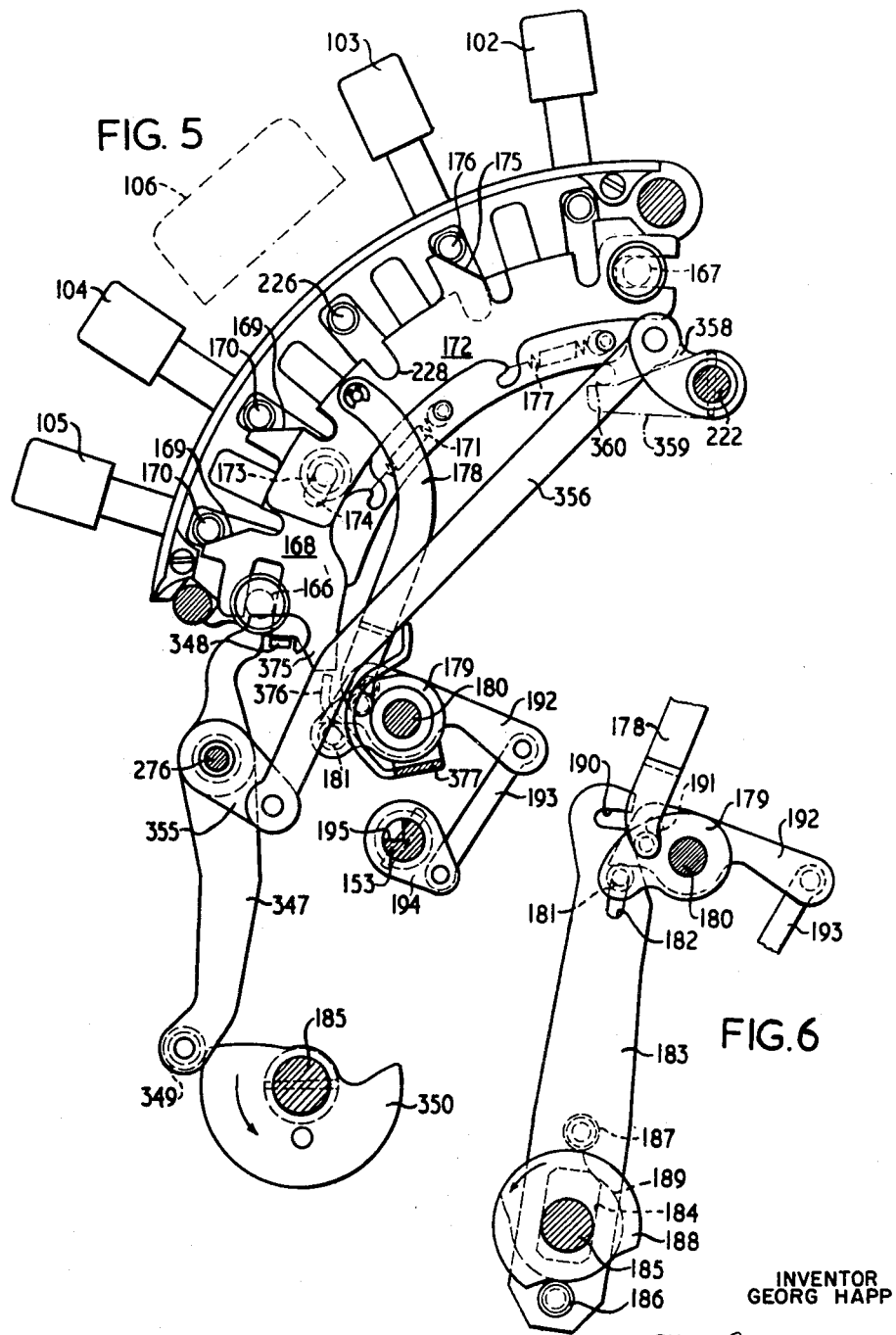

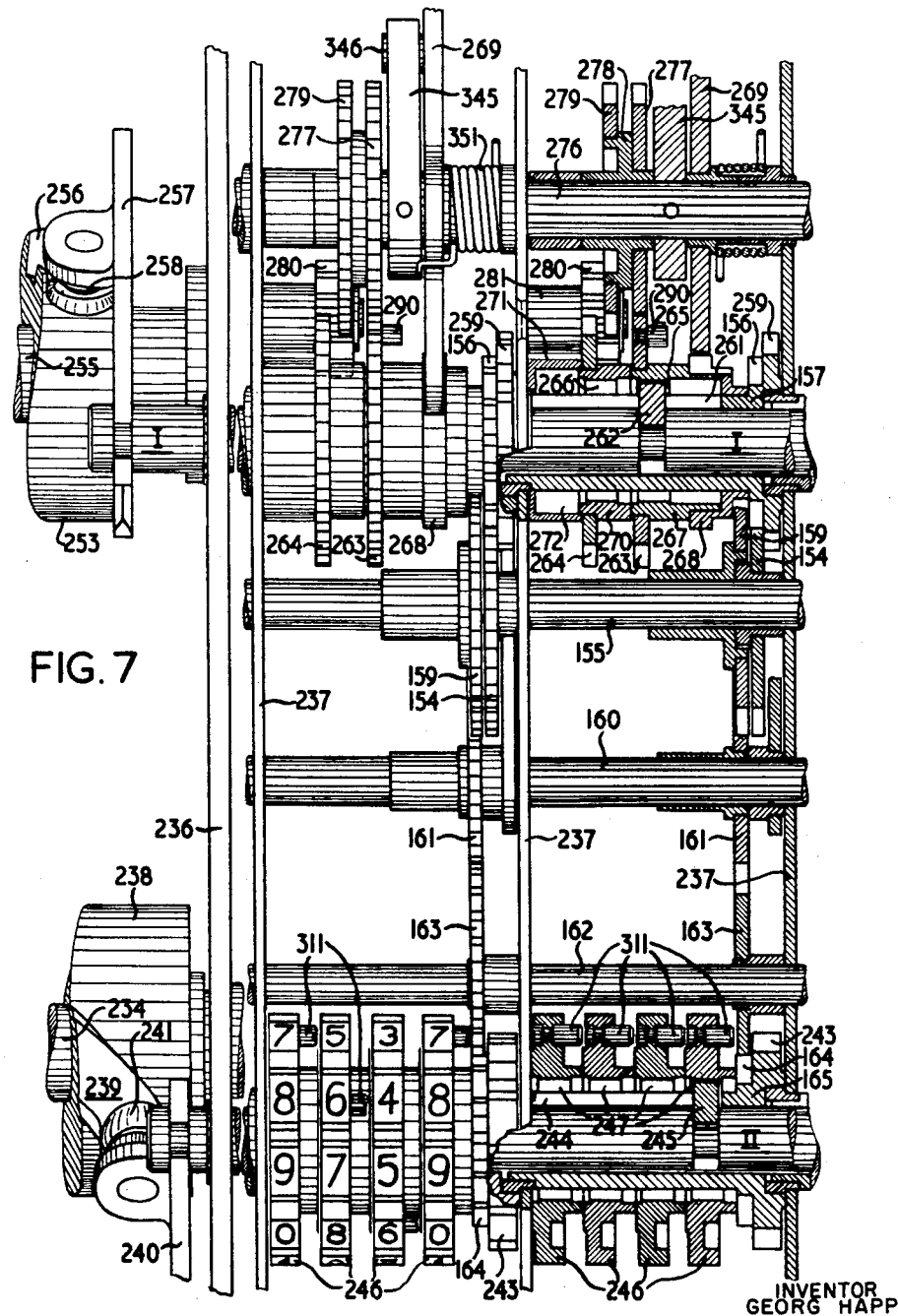

INVENTOR
GEORG HAPP

Aug. 21, 1962 G. HAPP 3,050,245
TOTALIZER ENGAGING CONTROLS
Filed April 15, 1958 13 Sheets-Sheet 9
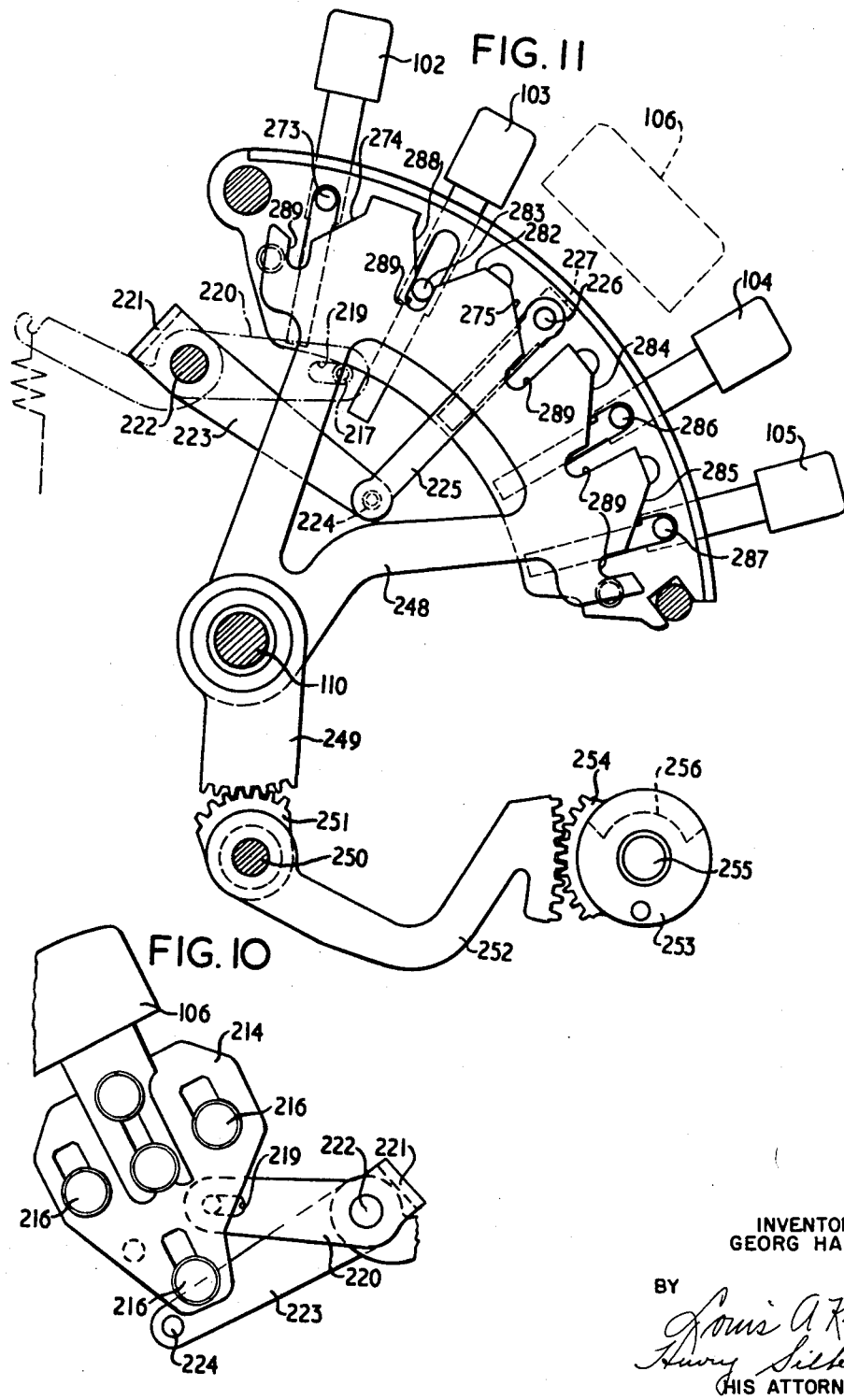
INVENTOR
GEORG HAPP
BY
Louis A. Kline
Henry Silbereis
HIS ATTORNEYS Aug. 21, 1962 G. HAPP 3,050,245
TOTALIZER ENGAGING CONTROLS
Filed April 15, 1958 13 Sheets-Sheet 10

INVENTOR
GEORG HAPP
BY *Louis A. Kline*
*Henry Silberis*
HIS ATTORNEYS

Aug. 21, 1962  G. HAPP  3,050,245
TOTALIZER ENGAGING CONTROLS
Filed April 15, 1958  13 Sheets-Sheet 11

INVENTOR
GEORG HAPP
BY
Louis A. Kline
Henry Silberus
HIS ATTORNEYS

Aug. 21, 1962 G. HAPP 3,050,245
TOTALIZER ENGAGING CONTROLS
Filed April 15, 1958 13 Sheets-Sheet 12
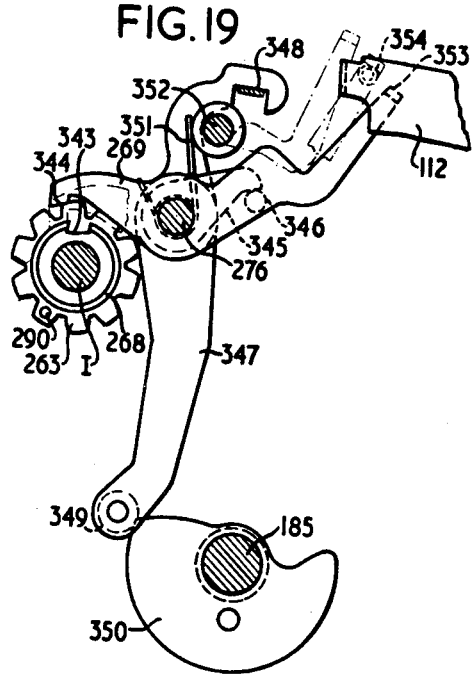
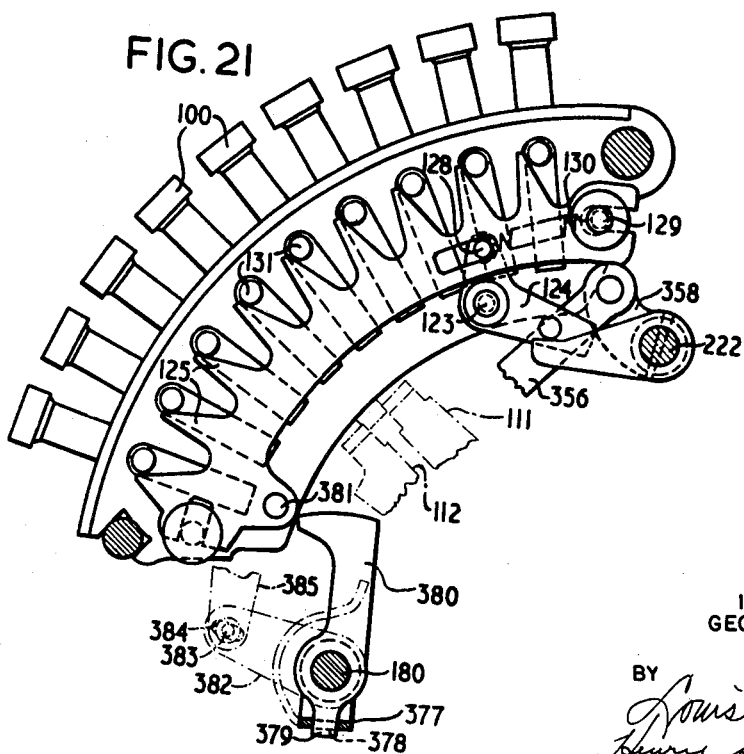
INVENTOR
GEORG HAPP
BY
Louis J. Kline
Henry Silvers
HIS ATTORNEYS

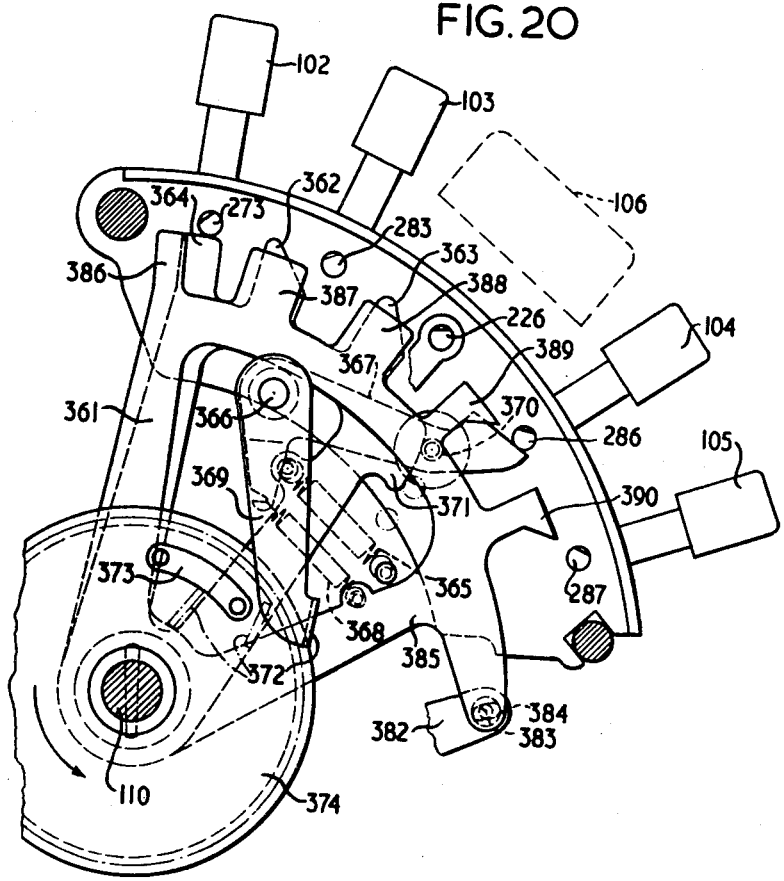

United States Patent Office 3,050,245
Patented Aug. 21, 1962

3,050,245
TOTALIZER ENGAGING CONTROLS
Georg Happ, Augsburg-Goggingen, Germany, assignor to The National Cash Register Company, Dayton, Ohio, a corporation of Maryland
Filed Apr. 15, 1958, Ser. No. 728,718
2 Claims. (Cl. 235—7)

This invention relates to cash registers or similar accounting machines having an item totalizer adapted to receive both positive entries and negative entries, and is particularly concerned with arrangements to control the actuation of the item totalizer.

Machines provided with an item totalizer adapted to receive both positive and negative entries have been known previously, but such machines are expensive to manufacture, due to the complicated arrangements required to control the actuation of the item totalizer, and have imposed a considerable load on the machine-operating mechanism due to the weight of the parts which have had to be shifted.

It is, therefore, the main object of the present invention to provide a machine in which the arrangements to control the actuation of the item totalizer comprise the minimum number of parts, thereby rendering the machine relatively cheap to manufacture.

A further object of the invention is to provide arrangements whereby the load on the machine-operating mechanism is reduced to the minimum.

Accordingly, the invention comprises a cash register or similar accounting machine adapted for the entry of single items and a series of items constituting a multiple-item entry, including amount keys; control keys; an add-subtract totalizer; a group totalizer; two sets of actuators, the first set of actuators being settable under control of the amount keys and cooperating with the item totalizer, the second set of actuators cooperating with the group totalizer; a coupling mechanism for coupling the two sets of actuators together for simultaneous operation; and a coupling control mechanism controlled by the control keys in such a manner that, upon depression of a certain one of the control keys, the two sets of actuators are coupled together, so that a set-up amount can simultaneously be added into both the item totalizer and the group totalizer, whereas, upon depression of certain other ones of the control keys, the coupling mechanism is rendered ineffective to couple the two sets of actuators, so that only the first set thereof can be effective.

The above and other, subsidiary, features of the present invention, as applied, by way of example, to one manner of carrying it into effect, will now be described and are illustrated in the accompanying drawings.

Figure 2B:
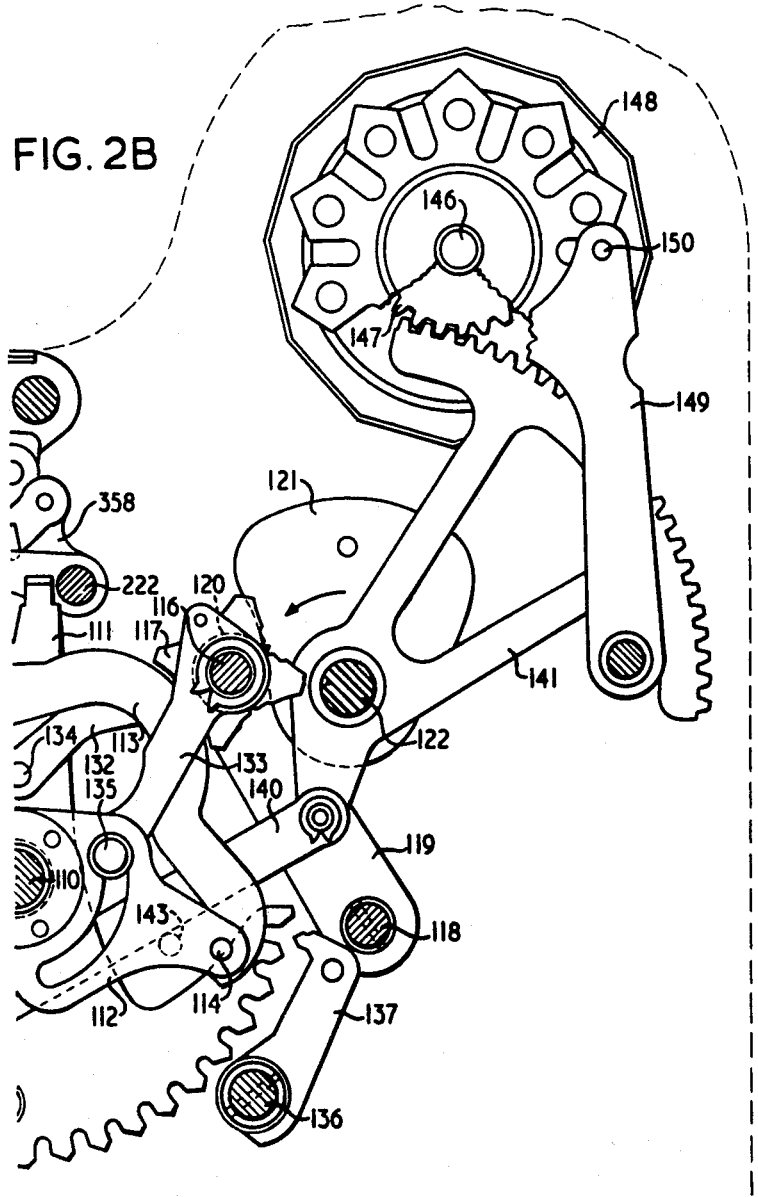
Figure 3:
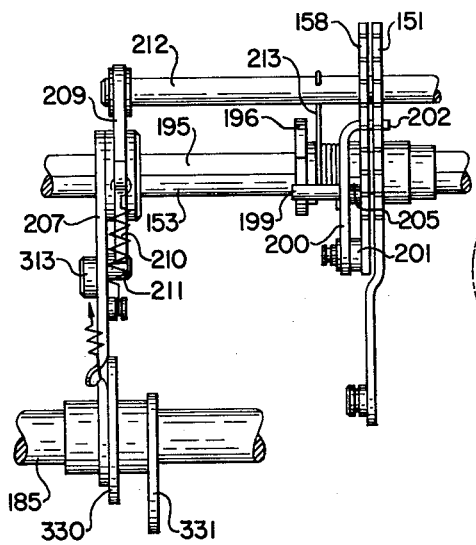
Figure 4:
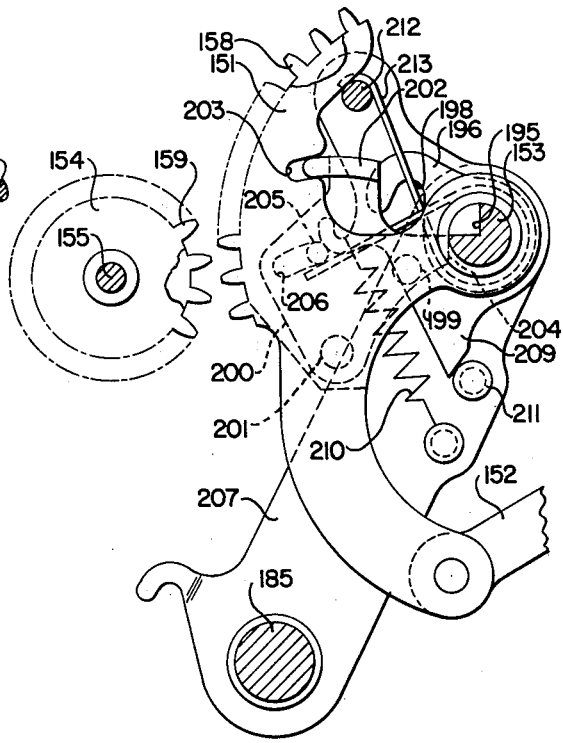
Figure 12:
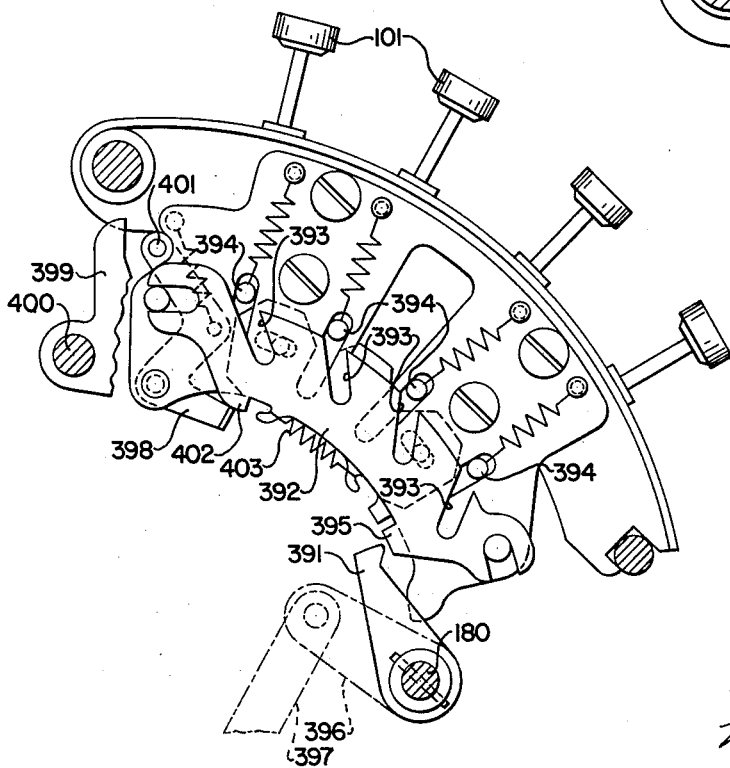
Figure 8:
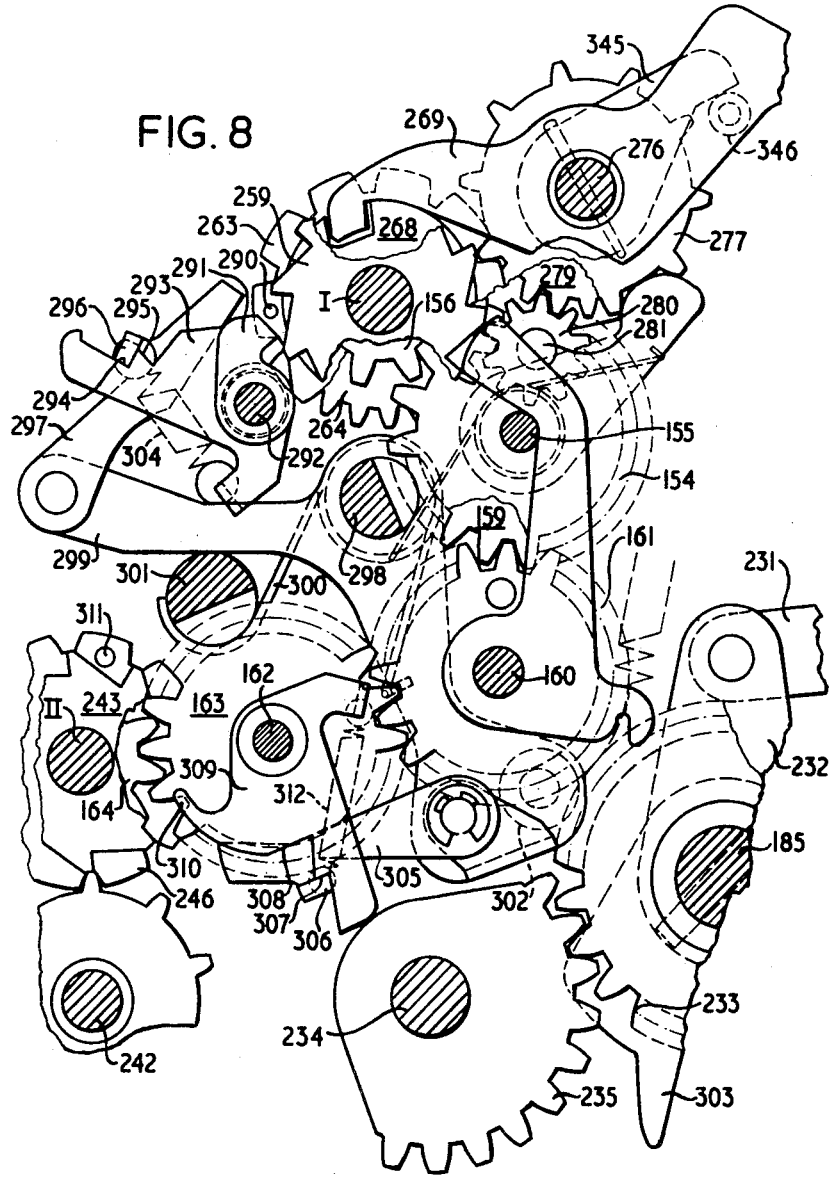
Figure 9:
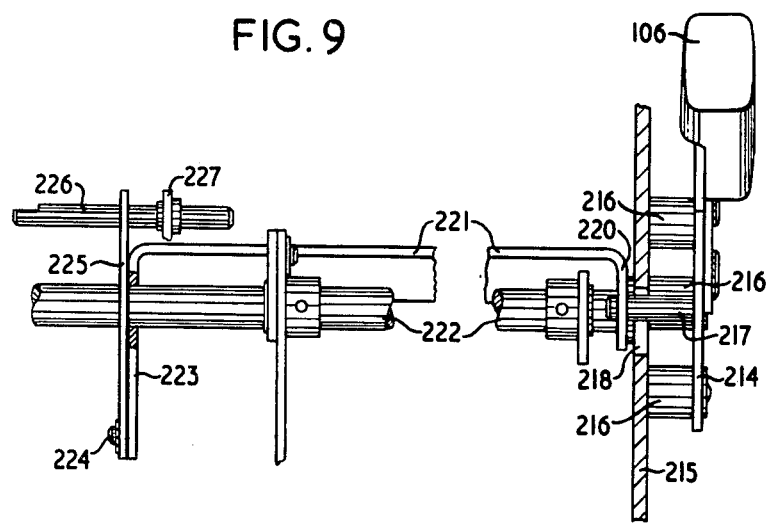
Figure 13:
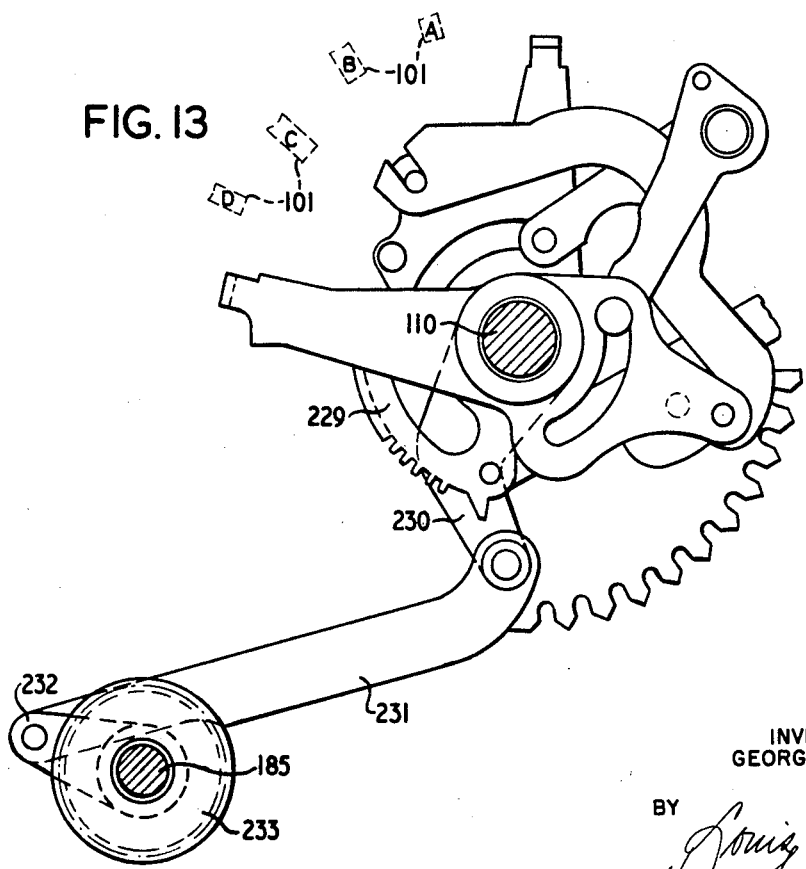
Figure 14:
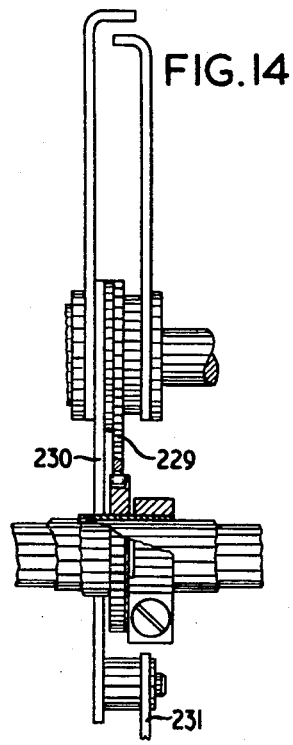
Figure 15:
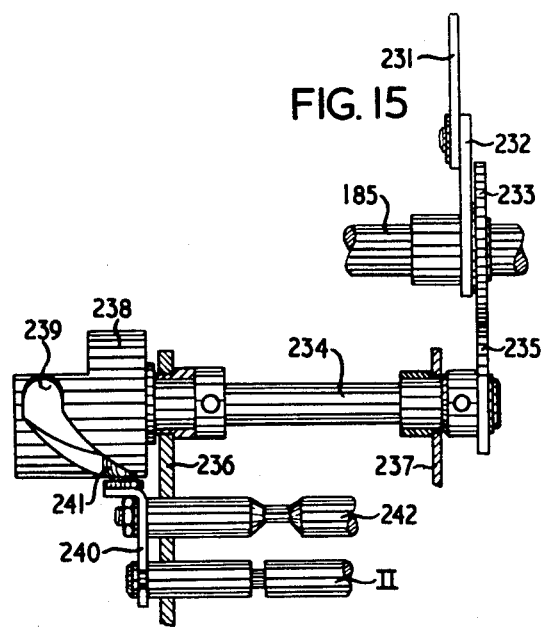
Figure 18:
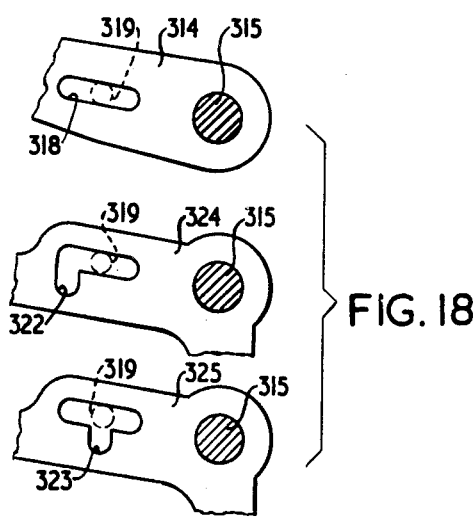
Figure 16:
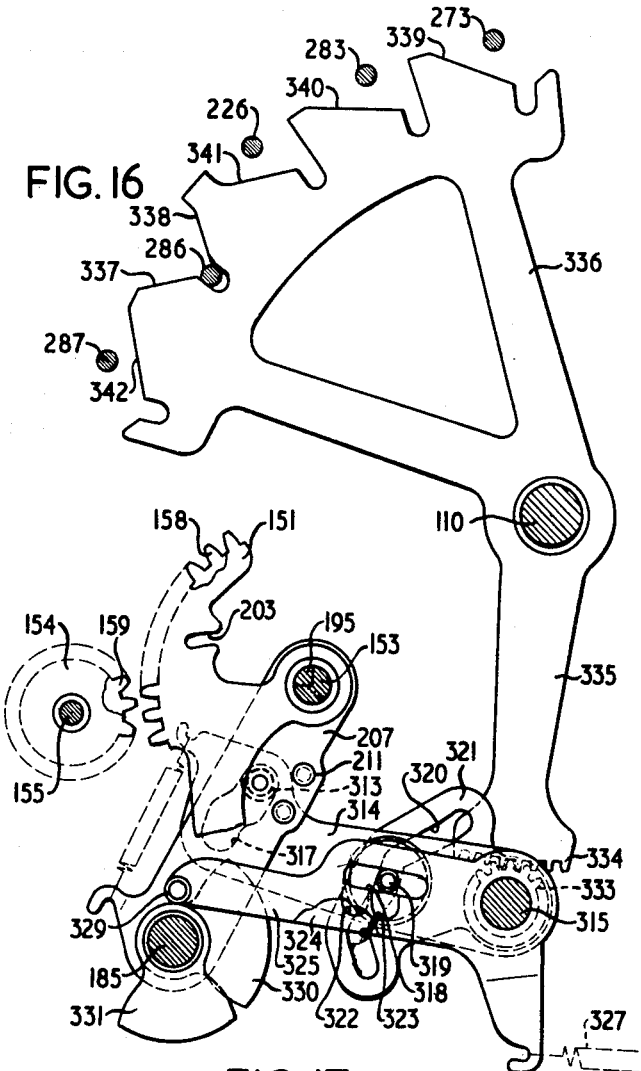
Figure 17:
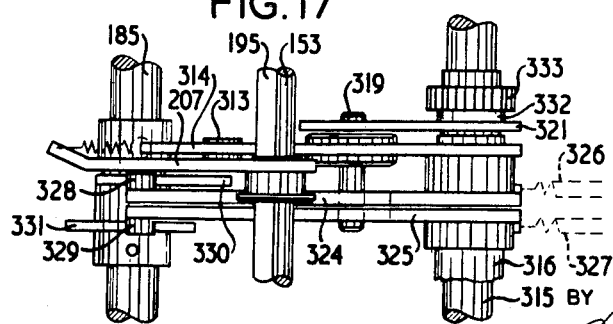

In the drawings:

FIG. 1 is a plan view of the keyboard of the machine,

FIGS. 2A and 2B, taken together, show a cross section through the machine to the right of one of the banks of amount keys, FIG. 3 is a front view of the mechanism for coupling and uncoupling the totalizer-actuating segments with or from each other, FIG. 4 is a side view of FIG. 3, FIG. 5 is a right side view of the control key bank and of the mechanism for controlling the uncoupling of the totalizer-actuating segments, FIG. 6 is a right side view of the uncoupling mechanism for the totalizer-actuating segments, FIG. 7 is a front elevation of part of the totalizer lines of the machine, and the mechanism for shifting the totalizer lines, FIG. 8 is a right side view of FIG. 7, FIG. 9 is a front view of the transmission from the "Itemizer" key to the control key bank, FIG. 10 is a right side view of FIG. 9, FIG. 11 is a left side view of part of the mechanism for controlling the selection of either the positive or the negative wheels of the item totalizer, FIG. 12 is a left side view of the clerks' key bank, and of an interlocking mechanism associated therewith, FIG. 13 is a right side view of the setting mechanism associated with the clerks' key bank, and the mechanism for selecting the clerks' totalizers, FIG. 14 is a front elevation of a portion of the mechanism for selecting the clerks' totalizers, FIG. 15 is a front elevation of a portion of the mechanism for selecting the clerks' totalizers, FIG. 16 is a right side view of the mechanism for determining the time of engagement and disengagement of the totalizer-actuating segments, FIG. 17 is a plan view of part of the mechanism shown in FIG. 16, FIG. 18 is a right side view of parts of the levers for controlling the engagement and disengagement of the totalizer-actuating segments, FIG. 19 is a right-side view of the mechanism for arresting the item totalizer in zero position during total-taking and sub-total-taking operations, FIG. 20 is a left side view of various interlocking mechanisms associated with the control key bank, and FIG. 21 is a right side view of an amount key bank and part of the mechanism for controlling the zero stop pawl during total-taking and sub-total-taking operations.

Keyboard

The keyboard of the illustrated machine includes four rows of amount keys 100 (FIG. 1), a row of insertable clerks' keys 101, a row of control keys 102—105, and an "Itemizer" key 106, which is connected to, and operates, a blind key stem in the row of control keys 102—105.

The control keys 102—106 are what are termed "motorized" keys; that is, depression of any one of these keys initiates a cycle of machine operation, provided that certain prior conditions have been fulfilled. For instance, the "Single Item" key 102, the "Subtract" key 103, and the "Itemizer" key 106 can only be depressed to initiate a machine cycle provided that a selected one of the four clerks' keys 101 has previously been depressed, whereas the "Total" key 104 and the "Sub-Total" key 105 can only be depressed to initiate a machine cycle provided that a selected one of the four clerks' keys 101 has previously been depressed and that no one of the amount keys 100 has previously been depressed. The interlocks between the amount keys 100, the clerks' keys 101, and the control keys 102—106 are known and, therefore, are described hereinafter only where necessary for an understanding of the present invention.

The "Single-Item" key 102, the "Subtract" key 103, and the "Total" key 104 have associated therewith an item counter, the wheels 107 of which are visible through openings 108 in the keyboard cover plate. Depression of any one of the control keys 102, 103, or 104 causes its related item counter to be advanced by one unit in order to provide a count of the number of times the machine has been cycled under control of each of these keys. Each item counter is resettable to zero by rotation of its related resetting wheel 109, which wheels protrude through openings in the keyboard cover plate and are placed under the control of a machine main lock (not shown) to prevent resetting of the item counters by any person who is not in possession of a key to the machine main lock.

The machine includes two superimposed totalizer lines having an add-subtract item totalizer mounted on an upper totalizer line I (FIG. 2A) and four interspersed totalizers, selected under control of the four clerks' keys 101 (FIG. 1), mounted on a lower totalizer line II (see FIGS. 7 and 8).

Depression of the "Single Item" key 102, subsequent to the setting up of an amount by depression of selected amount keys 100 and the depression of a selected one of the clerks' keys 101, causes the set-up amount to be entered additively only into the totalizer on line II corresponding to the selected clerk's key 101, printed on an issuing ticket and on a detail strip, and displayed on indicators, as will be explained in detail hereinafter. Near the conclusion of the machine cycle, the depressed amount keys 100 and the selected clerk's key 101 will automatically be released for return to their normal positions.

When the machine is released at the commencement of a multiple-item transaction by depression of the "Itemizer" key 106, subsequent to the setting up of an amount by depression of selected amount keys 100 and the depression of a selected one of the clerks' keys 101, the amount set up is simultaneously added into the item totalizer on line I and into the totalizer on line II corresponding to the selected clerk's key 101. The amount is also printed on the issuing ticket and on the detail strip, and is displayed on the indicators. Near the conclusion of the machine cycle, the depressed amount keys 100 are automatically released for return to their normal positions, the selected clerk's key 101 being retained in depressed position until the conclusion of the multiple-item transaction by mechanism which is well known and, therefore, not described herein.

When it is desired to initiate a subtract operation during the course of a multiple-item transaction, the amount to be subtracted is first set up by depression of selected amount keys 100, followed by depression of the "Subtract" key 103. The amount set up is subtracted from the item totalizer on line I but, in the present machine, is not subtracted from the totalizer on line II which corresponds to the clerk's key 101 depressed at the commencement of the multiple-item transaction. The amount is also printed on the issuing ticket and on the detail strip, together with a subtract symbol, and is displayed on the indicators.

The "Total" key 104 controls the item totalizer on line I, and depression thereof initiates a machine cycle in which the item totalizer is reset to zero, the amount contained in the item totalizer being entered into the differential mechanism, printed upon the issuing ticket and upon the detail strip, and displayed on the indicators. As depression of the key 104 terminates a multiple-item transaction, the clerk's key 101 depressed at the commencement of the multiple-item transaction is released near the end of the machine cycle.

The "Sub-Total" key 105 controls the item totalizer on line I in a similar manner to the "Total" key 104, with the exceptions that the total taken from the item totalizer is re-entered thereinto and that the depressed clerk's key 101 is not released at the end of the machine cycle.

The four interspersed totalizers on line II cannot be reset from the machine keyboard with the machine main lock in its normal "Register" position, but can be reset one after another by depression of each clerk's key 101 followed by depression of the "Single Item" key 102 when the machine main lock has been moved to a special "Reset" position, thereby preventing resetting of the totalizers on line II by persons not in possession of a key to the machine main lock.

From the above description, it will be apparent that, in the present machine, subtractive items are entered only into the item totalizer, and, therefore, the total of all subtractive items recorded on the detail strip must be obtained in order to enable the totals contained in the totalizers on line II to be balanced against the cash received.

*Setting Mechanism*

The differential setting mechanisms of the illustrated machine are of known construction, as illustrated in British Patent No. 703,886, published February 10, 1954, and, therefore, only a brief description of the setting mechanism associated with one of the denominational orders of amount keys will be given hereinafter.

Mounted on a machine main shaft 110 (FIGS. 2A and 2B) are a pair of setting members 111 and 112, the first of which is hereinafter designated as the amount differential member 111 and the second of which is hereinafter designated as the complementary member 112. A beam 113 is pivotally secured at one of its ends to a pin 114 in the complementary member 112 and has its other end pivotally secured to a pin 115 in the amount differential member 111, so that movement of the beam 113 imparts opposite rotary movements to the pair of setting members.

Each beam 113 has associated therewith a cam member 117 mounted on a rod 116 supported by two arms 119 (only one of which is shown), which arms are pinned to a shaft 118. A roller 120 is provided at each end of the rod 116, and each roller cooperates with a cam 121 of a pair of cams pinned to a cam shaft 122. When the cam shaft 122 is driven counter-clockwise (FIG. 2B) by a known and, therefore, not described driving mechanism, cooperation of the cams 121 with the rollers 120 rocks the arms 119 and the shaft 118 counter-clockwise (FIG. 2B), so as to force each cam member 117 against its beam 113 and to move the latter toward the machine main shaft 110.

Movement of the beam 113 toward the shaft 110 causes the amount differential member 111 to rock counter-clockwise and the complementary member 112 to rock clockwise until an upper end portion of each of such setting members comes into contact with the opposite sides of the stem of a depressed amount key 100 (for instance, the stem of the "5" key, shown in dotted lines in FIG. 21) or until both have been set according to the value contained in the item totalizer, as will be explained later.

When no one of the amount keys 100 in a key bank has been depressed, a zero stop pawl 124, mounted on a pin 123 in the key frame, normally blocks counter-clockwise movement of the amount differential member 111. In the latter case, the complementary member 112 is moved clockwise until, in the manner described later herein, it reaches a set position corresponding to that of the blocked amount differential member 111. FIGS. 2A and 2B show the zero stop pawl 124 in its inoperative position, in which position it was moved by mechanism to be described hereinafter in connection with the taking of a total or a sub-total from the item totalizer.

Each bank of amount keys 100 has associated therewith a slidably-mounted detent 127, having nine projections 125 and a slot 126. A pin 128 on the zero stop pawl 124 protrudes through the slot 126 and has one end of a spring 130 secured thereto, the other end of the spring being secured to a pin 129 in the key frame, so as to tend to rock the zero stop pawl 124 clockwise. Pins 131, secured to the stems of the amount keys 100, bear upon cam surfaces of the projections 125 of the detent 127 when the amount keys are depressed, so as to move the detent 127 downwardly.

Upon downward movement of the detent 127, the right-hand edge of its slot 126, which normally engages the pin 128 of the zero stop pawl 124, moves the latter counter-clockwise (FIG. 2A), against the action of the spring 130, out of the path of movement of the amount differential member 111.

Restoration of the amount differential members 111 and 112 to their home positions occurs, in known manner, through two resetting arms 132 and 133, mounted on the rod 116 and each carrying a pin 134 and 135, respectively. The pins 134 and 135 are guided in long arcuate slots in the setting members and, upon clockwise return movement of the arms 119 and the rod 116, engage the right-hand ends of said long slots, so as to restore the setting members to their home positions.

During the interval between the setting and restoring movements of the setting members, the latter are aligned in set positions by means of teeth on the amount differential members 111 being engaged by a tooth on each of a plurality of aligning arms 137 pinned to a shaft 136. The mechanism for rocking the shaft 136 so that the teeth on the arms 137 engage the teeth on the amount differential members 111 is not described herein.

Indicator and Printer Setting Mechanisms

Freely mounted on a hub 138 of the complementary setting member 112 is a forwardly directed printer setting gear segment 139, which, through a link 140 extending rearwardly therefrom, is connected to a rearwardly directed indictaor setting gear segment 141, freely mounted on the cam shaft 122 (FIGS. 2A and 2B). Secured to the amount differential setting member 111 is a pin 142, which extends to the right therefrom for engagement with the upper, rear edge of the gear segment 139. In a like manner, secured to the complementary setting member 112 is a pin 143, which extends to the left therefrom for engagement with the lower, rear edge of such segment 139. The overall arcuate distance between such upper and lower rear edges of the gear segment 139 is such that, when, as set out above, the upper end portions of the setting members 111 and 112 contact the opposite sides of the stem of a depressed amount key 100, the respective pins 142 and 143 thereof likewise contact the opposite upper and lower edges of such segment 139. That is, in view of such gear segment and pin arrangement, a distance equal to the width of the amount key stem is always maintained between the upper end portions of the setting members 111 and 112, when same are caused to be rocked counter-clockwise and clockwise, respectively, as described above, to what may be termed a closed or set position.

From such construction, it is apparent that, upon each movement of the setting members 111 and 112 to a closed position, the respective pins 142 and 143 thereof engage the related rear edges of the gear segment 139 and cause such segment to be moved to a set position corresponding to that at which the members 111 and 112 have been set. Then, upon later restoration to home position (as shown in FIGS. 2A and 2B) of such members 111 and 112, through the mechanism described above, the pins 142 and 143 move reversely with respect to such gear segment edges, thus enabling the gear segment 139 to remain in that position to which it was set. From such operation of the gear segment 139—that is, not returning to a home position along with the setting members 111 and 112—it is understood that the setting movement imparted thereto is actually under control of one or the other only of the setting member pins 142 and 143, depending upon where such segment 139 was left at the close of the preceding machine operation. If left at a set position lower in number than that at which it is now to be set (such as at zero, as illustrated in FIGS. 2A and 2B), the pin 142 of setting member 111 will engage same and rock it counter-clockwise toward the pin 143 of setting member 112—which pin 143, incidentally, is at the same time being rocked toward the segment 139 as setting member 112 is seeking the stem of the newly depressed amount key 100. If, on the other hand, such segment 139, through the previous machine operation, was left at a higher in number set position, the pin 143 will engage same and rock it clockwise as the setting member 112 is operated. In either instance, when both the amount differential setting member 111 and the complementary setting member 112 have reached their set or closed positions, whether controlled by one of the key stems or the amount contained in the totalizer (as described later), the respective pins 142 and 143 thereof each engages the related edge of the gear segment 139, thus setting same at a corresponding position.

As the gear segment 139 is being so set, the interconnected link 140 is shifted thereby for likewise moving the gear segment 141 to a position corresponding to that at which the setting members 111 and 112 have been set. Like the gear segment 139, this segment 141 is also not affected by the restoration to home position of such setting members. Meshing with the teeth of gear segment 141 is a gear 147 secured to one of a plurality of nested tubes (not shown) mounted on a shaft 146, the gear 147 being integral with an indicator drum 148. Thus, the setting of the segment 141 is transmitted to the indicator drum 148.

After the indicator drum 148 has been set, an aligning pin 150, supported by an arm 149, is engaged, in known manner, in one of a series of notches formed on the indicator drum 148, so as to retain and align the latter in its set position.

The toothed segment 139 meshes with a gear 144, which, in turn, is secured to one of a plurality of nested tubes (not shown) mounted on a shaft 145. Thus, the setting of the segment 139 is transmitted, via the gear 144 and the related nested tube, to a type wheel (not shown) of a printing mechanism (not shown), which type wheel may be either secured to or geared to the other end of the nested tube.

Totalizer-Actuating Mechanism

A totalizer-actuating segment 151, freely mounted on a shaft 153, is connected to the amount differential member 111 by a link 152. The shaft 153 is mounted between a pair of arms 207 (see FIG. 3), so that it can be rocked counter-clockwise about a shaft 185, in a manner to be described hereinafter, to engage the totalizer-actuating segment 151 with an intermediate wheel 154. The intermediate wheel 154 is mounted on a shaft 155, supported by totalizer side frames, and meshes with a gear 156 (FIGS. 2A and 7) secured to a grooved bushing 157, mounted on the totalizer line I. The item totalizer is driven, in a manner described later herein, by means of the actuating segment 151, the intermediate wheel 154, the gear 156, and the grooved bushing 157.

A further totalizer-actuating segment 158 (FIGS. 3 and 4) is mounted on the shaft 153, adjacent the totalizer actuating segment 151 (FIGS. 2A and 3), for actuating the totalizers on totalizer line II. The segment 158 is normally coupled to the segment 151, for unitary movement therewith, by means of a coupling mechanism to be described.

When the shaft 153 (FIG. 2A) is rocked so as to engage the segment 151 with the intermediate wheel 154, the segment 158 (FIGS. 3 and 4) is simultaneously engaged with an intermediate wheel 159 (FIGS. 4 and 7) mounted on the shaft 155 and located adjacent the intermediate wheel 154.

The intermediate wheel 159 meshes with a gear 161, mounted on a shaft 160 (FIGS. 7 and 8), which, in turn, meshes with a gear 163 mounted on a shaft 162. The gear 163, in turn, meshes with a gear 164, secured to a grooved bushing 165 (FIG. 7), mounted on the totalizer line II. The clerks' totalizers on totalizer line II are, therefore, driven through the segment 158 (FIGS. 3 and 4), the intermediate wheel 159 (FIGS. 4, 7, and 8), the gears 161, 163, and 164 (FIGS. 7 and 8), and the grooved bushing 165.

Coupling Mechanism for the Totalizer-Actuating Segments

As all the totalizer-actuating segments 151 and 158 for each denominational order are coupled with, and uncoupled from, one another in the same manner, only the coupling mechanism associated with one denominational order will be described.

The totalizer-actuating segment 151 (FIGS. 3 and 4) is normally coupled with the totalizer-actuating segment 158, so that, during machine operations in which the coupling is permitted to remain effective, the item totalizer and the selected clerk's totalizer are actuated simultaneously.

However, the coupling is rendered ineffective when a machine operation is initiated by depression of either the "Subtract" key 103, the "Total" key 104, or the "Sub-Total" key 105, since, during such machine operations, only the item totalizer on totalizer line I is actuated.

Secured to a key frame of the bank of control keys are two studs 166 and 167 (FIG. 5), on which is slidably mounted a detent 168. The detent 168 has two projections, each having a cam surface 169 cooperating with a stud 170 secured in the key stem of the "Total" key 104 and the "Sub-Total" key 105. A spring 171, tensioned between the detent 168 and a pin in the key frame, normally retains the detent 168 in the position shown in FIG. 5.

Adjacent the detent 168 is provided a second detent 172 slidably mounted at one end on the stud 167 and at its other end having a pin 173 secured thereto, which pin is slidably engaged within a slot 174 in the detent 168. The detent 172 has a projection provided with a cam surface 175, which surface cooperates with a pin 176 secured in the stem of the "Subtract" key 103. The detent 172 is normally held by a spring 177, tensioned between the detent 172 and a pin secured to the key frame of the control bank, so that its pin 173 engages the right-hand edge of the slot 174.

A link 178 connects the detent 172 to a coupling control arm 179 (FIGS. 5 and 6) mounted on a shaft 180. Secured to the arm 179 is a pin 181 projecting into a slot 182 (FIG. 6) of a lever 183 supported on the shaft 185 by means of a slot 184. The lever 183 has mounted thereon two rollers, 186 and 187, one, 186, of which cooperates with a cam 188 and the other, 187, of which cooperates with a cam 189, the cams being pinned to the shaft 185. Shortly after commencement of each machine operation, the shaft 185 is rotated counter-clockwise, causing the cams 188 and 189 to impart a downward movement to the lever 183 and to restore the lever 183 upwardly near the conclusion of the machine operation.

The lever 183 (FIG. 6) has a notch 190, which is provided for cooperation with a pin 191 carried by a lever 192 mounted on the shaft 180, which lever 192, through a link 193 (FIG. 5), is connected to an arm 194 pinned to the shaft 153.

The shaft 153 has a right-angled recess 195 along its entire length and carries a coupling control pawl 196 (FIGS. 2A, 3, and 4) for each pair of totalizer-actuating segments 151 and 158. Each of the pawls 196 has a right-angled projection in its boring, which cooperates with the recess 195 to secure it on the shaft 153.

Referring to FIGS. 2A and 4, the pawl 196 has a notch 198 for cooperation with a pin 199 secured to a coupling arm 200. The coupling arm 200 is mounted upon a pin 201 secured to the totalizer-actuating segment 158 (FIGS. 3 and 4) and has an ear 202 extending to the right, as shown in FIG. 3. The ear 202 can be engaged with, or disengaged from, a notch 203 in each of the actuating segments 151 and 158 in a manner to be described shortly. Each of the coupling arms 200 has a rectangular extension 204, which normally engages the periphery of the shaft 153 but which engages the recess 195 of the shaft 153 when the totalizer-actuating segments 151 and 158 are uncoupled from one another.

Clockwise and counter-clockwise movement, respectively, of the coupling arm 200 (FIGS. 2A and 4) is limited by a pin 205 secured to the totalizer-actuating segment 158 and protruding into a slot 206 formed in the coupling arm 200.

Each end of the shaft 153 is mounted in a rocking arm 207 (only one of which is shown in FIGS. 3 and 4). The rocking arms 207 are pivotally mounted on the shaft 185 and are rocked in a manner to be described hereinafter, so that the totalizer-actuating segments 151 and 158 are engaged with and disengaged from the intermediate wheels 154 and 159 in correct timing.

Mounted on the shaft 153, adjacent each of the rocking arms 207, is an arm 209. The arms 209 carry therebetween an aligning rod 212 for the totalizer-actuating segments 151 and 158 and are normally held in engagement with pins 211 secured to the rocking arms 207 by springs 210.

When the machine is in normal position, the totalizer-actuating segments 151 and 158 bear against the aligning rod 212.

When the ear 202 of the coupling arm 200 is disengaged from the notches 203 in the totalizer-actuating segments 151 and 158, each segment 158 is held in engagement with the aligning rod 212 by a torsion spring 213. Referring to FIGS. 3 and 4, each torsion spring 213 is wound around the shaft 153 and engages, on the one hand, the aligning rod 212 and, on the other hand, the pin 205 secured in each totalizer-actuating segment 158.

As already described, the totalizer-actuating segments 151 and 158 are normally coupled together by the coupling arms 200, and, when a machine operation is initiated by the depression of either the "Single Item" key 102 (FIGS. 1 and 5) or the "Itemizer" key 106 (FIG. 1), the said coupling is maintained.

However, when a machine operation is initiated by depression of the "Subtract" key 103, the "Total" key 104, or the "Sub-Total" key 105, the totalizer-actuating segments 151 and 158 are uncoupled, so that the appropriate machine operation will be carried out only in conjunction with the item totalizer on the totalizer line I.

Depression of the "Subtract" key 103 (FIG. 5) moves the detent 172 and the link 178, pivoted thereto, downwardly through the cooperation of the pin 176 in its key stem with the cam surface 175.

As already described, the studs 170 (FIG. 5) in the key stems of the "Total" key 104 and the "Sub-Total" key 105 cooperate with cam surfaces 169 formed on the detent 168. Therefore, when any one of said keys is depressed, the detent 168 is moved downwardly. As the pin 173, secured to the detent 172, protrudes into the slot 174 of the detent 168, downward movement of the latter is imparted to the detent 172 and causes downward movement to be imparted to the link 178.

Referring to FIGS. 5 and 6, the coupling control arm 179 is rocked counter-clockwise by downward movement of the link 178. As the pin 181 in the coupling arm 179 protrudes into the slot 182 (FIG. 6) of the lever 183, the latter is rocked clockwise by counter-clockwise movement of the arm 179, and the notch 190 is engaged over the pin 191 on the lever 192.

Now, when the shaft 185 is driven counter-clockwise at the commencement of a machine operation, the cams 188 and 189, secured thereto and cooperating with the rollers 186 and 187 (FIG. 6), move the lever 183 downward, a counter-clockwise movement being imparted, via the pin-and-slot connection 190—191, to the lever 192.

Counter-clockwise movement of the lever 192 is imparted, via the link 193 (FIGS. 5 and 6) and the arm 194, to the shaft 153 (see also FIGS. 3 and 4). As a consequence, the coupling control pawls 196, secured on the shaft 153, are rocked counter-clockwise, their notches 198 being moved over the pins 199 secured to the coupling arms 200.

The curvatures of the notches 198 are eccentric relative to the pins 199 in the coupling arms 200, so that, upon counter-clockwise movement of the pawls 196 (FIG. 4), the pins 199 are rocked toward the right, rocking the coupling arms 200 clockwise and the ears 202 out of engagement with the notches 203, so that the totalizer-actuating segments 151 and 158 are uncoupled from one another. Upon clockwise rocking of the coupling arms 200, their extensions 204 (FIG. 4) enter the recess 195 of the shaft 153 as the latter is rocked counter-clockwise by the link 193.

Thus, during the said machine operation, merely the item totalizer on the totalizer line I is actuated, as the totalizer-actuating segments 158 for the totalizers on totalizer line II are uncoupled from the totalizer-actuating segments 151 and, during actuation of the segments 151, are retained in their normal positions by the spring 213.

Prior to the conclusion of the machine operation, the cams 188 and 189 (FIG. 6) on the shaft 185 move the lever 183 upwardly, rocking the lever 192 clockwise via the pin-and-slot connection 190—191. Clockwise movement of the lever 192 is imparted, through the link 193 (FIGS. 5 and 6) and the arm 194, to the shaft 153 so as to cause, on the one hand, the pawls 196 mounted thereon to move out of cooperative relationship with the pins 199 in the coupling arms 200 and, on the other hand, the extensions 204 of the coupling arms 200 to disengage from the recess 195 of the shaft 153. Disengagement of the coupling arms 200 imparts a counter-clockwise movement thereto, which movement engages the ears 202 with the notches 203 of the totalizer-actuating segments 151 and 158, so that the latter are again coupled together for unitary movement during subsequent machine operations.

Restoration of the lever 183 to its normal position, as shown in FIG. 6, is obtained by upward movement of the detent 172 (FIG. 5). The detent 172 is moved downwardly by depression of any one of the keys 103, 104, or 105, which, when released prior to the end of a machine operation, are moved upwardly by springs (not shown), thereby permitting the spring 177, or the springs 177 and 171, to restore the detent 172, or the detents 168 and 172, to its or their normal position or positions. Restoration of the detent 172 lifts the link 178 (FIG. 5) and rocks the coupling control arm 179 (see also FIG. 6) clockwise to restore the lever 183 counter-clockwise to its normal position.

*Transmission from the "Itemizer" Key to the Bank of Control Keys*

As depression of the "Itemizer" key 106, located at the right-hand side of the key board, is required to depress a blind key stem in the row of control keys 102–105, located at the left-hand side of the keyboard, a transmission mechanism, shown in FIGS. 9 and 10, is provided.

Referring to FIGS. 9 and 10, the "Itemizer" key 106 is mounted on a guide plate 214 slidably secured on three pins 216 secured to a right side frame 215 of the machine. Mounted on the guide plate 214 is a pin 217, which protrudes through an opening 218, formed in the machine side frame 215, and engages a slot 219 of a right-hand arm 220 (see also FIG. 11) of a yoke 221. The yoke 221 is rotatably mounted on a shaft 222 and has, in its left-hand arm 223, a pin 224, pivoted to a link 225. The upper end of the link 225 is pivoted to a pin 226 secured in a blind key stem 227 slidably mounted in the key frame of the row of control keys 102–105.

Upon depression of the "Itemizer" key 106, the yoke 221 is rocked counter-clockwise, as seen in FIG. 10, through the pin 217 and the slot 219, and clockwise, as seen in FIG. 11. Upon clockwise movement of the arm 223 (FIG. 11) of the yoke 221, the blind key stem 227, via the link 225, is moved down into the path of movement of the setting members associated with the bank of control keys. The setting members of the bank of control keys are, therefore, closed around the blind key stem 227 during a machine operation initiated by depression of the key 106 to position a printing wheel and an indicator drum (not shown) in known manner to print and indicate a corresponding symbol.

Upon restoration of the "Itemizer" key 106, in a manner known per se, toward the end of the machine cycle initiated thereby, the blind key stem 227 is also restored to its normal position, as shown in FIG. 11.

Referring to FIG. 5, each of the detents 168 and 172 has a notch 228, which notches, in the normal positions of the detents, are in the path of movement of the pin 226 and are so shaped that the detents are not moved by downward movement of the pin 226. As the detents 168 and 172 remain in their normal positions upon depression of the "Itemizer" key 106, the totalizer-actuating segments 151 and 158 remain coupled together for unitary movement during machine operations initiated by depression of the "Itemizer" key 106, thereby to effect entry of set-up amounts both into the item totalizer and into the selected one of the clerks' totalizers.

*Selection of the Clerks' Totalizers on Line II*

As already mentioned, the totalizers on line II are selected under control of the clerks' keys 101 (FIG. 1).

FIGS. 13 and 14 illustrate the setting mechanism associated with the bank of the clerks' keys 101, which mechanism, with the exception of an arm 230 secured to its printer-setting segment 229, is similar to the setting mechanism previously described in connection with FIGS. 2A and 2B and associated with the amount keys 100.

The arm 230 (FIG. 13), through a link 231 (see also FIGS. 8 and 15), is connected to an arm 232 mounted on the shaft 185, to which latter arm is rigidly secured a gear 233. The gear 233 (FIGS. 8 and 15) meshes with a toothed segment 235 pinned to a shaft 234 journaled in a left-hand totalizer side frame 236 (FIG. 15) and in an intermediate frame 237, the shaft 234 having a drum cam 238 (see also FIG. 7), provided with a cam groove 239, secured to its left-hand end.

A roller 241 is rotatably secured to an ear of an arm 240 and engages within the cam groove 239, the arm 240 being supported by the totalizer line II and by a shaft 242, both the totalizer line II and the shaft 242 being laterally shiftable in the totalizer framework.

As all the denominational rows of the four interspersed clerks' totalizers are similar in construction, only the second-highest denominational order, shown in section in FIG. 7, will now be described in detail.

As previously mentioned, each denominational order of the clerks' totalizers has associated therewith a grooved bushing 165, rotatable about the totalizer line II. The grooved bushing 165 (FIG. 7) has secured thereon the driving gear 164, adjacent its right-hand end, which is formed as a tens transfer ratchet wheel 243. A groove 244 of the grooved bushing 165 has slidably mounted therein a rider 245 mounted within an annular groove in the totalizer line II.

The four interspersed totalizer wheels of each denominational order of the clerks' totalizers are mounted on each grooved bushing 165, and each is provided with internal teeth 247. Referring to FIG. 7, the rider 245 is shown in mesh with the internal teeth 247 of the right-hand totalizer wheel 246 of the second-highest denominational order, to which position it was moved during the preceding machine operation by the setting of the printer-setting segment 229 under the control of the depressed "A" clerk's key 101.

If, prior to a subsequent machine operation, either the "B," "C," or "D" clerks key 101 is depressed, initiation of a machine operation causes the setting members of the row of clerks' keys to move the printer-setting segment 229 and the arm 230 counter-clockwise, as seen in FIG. 13, to an extent corresponding to the depressed clerk's key. Counter-clockwise movement of the arm 230 imparts clockwise movement to the arm 232, through the link 231, and to the gear 233. Clockwise movement of the gear 233, through the segment 235, imparts counter-clockwise movement to the shaft 234 and to the drum cam 238 (FIGS. 8 and 15), which, through its cam groove 239 and the roller 241, carried by the arm 240, shifts the shaft 242 and the totalizer line II toward the left, as seen in FIGS. 7 and 15. The rider 245 (FIG. 7) is thereby shifted to the left to an extent determined by the depressed clerk's key 101, and is engaged with the internal teeth 247 of the appropriate totalizer wheel 246.

*Selection of the Item Totalizer on Line I From the Control Keys*

As previously mentioned, the machine is provided with an add-subtract item totalizer on the totalizer line I. The usual plus and minus wheels of the item totalizer are geared together for reverse rotation, so that, when the plus wheels are selected and actuated, they will be driven in an additive direction, while, when the minus wheels are selected and actuated, they will be driven in an additive direction and reversely rotate the plus wheels to enter the complement of the amount to be subtracted.

The selection of the plus wheels of the item totalizer occurs under control of depression of the "Itemizer" key 106 during additive entries, and under control of the "Total" key 104 and the "Sub-Total" key 105 during total-taking operations. The selection of the minus wheels of the item totalizer occurs under control of depression of the "Subtract" key 103, as will now be explained in detail.

Referring to FIG. 11, the control keys 102—106 have associated therewith a sector 248, rigidly connected to a toothed segment 249, the sector 248 being rotatably mounted on the main shaft 110. The segment 249 meshes with a toothed segment 251 on a stud 250 and is rigidly connected to a toothed segment arm 252 in mesh with a toothed segment 254 secured to a drum cam 253. The drum cam is mounted on a stud 255 secured to the left-hand totalizer side frame 236 (FIG. 7) and has a cam groove 256, in which is guided a roller 258 rotatably secured on an arm 257. The arm 257 is secured to a laterally-shiftable shaft (not shown) and to the totalizer line I (FIG. 7), which also is laterally shiftable in the totalizer framework.

As all the denominational orders of the item totalizer are similar in construction, only the second-highest denominational order, shown in section in FIG. 7, is described in detail.

Each denominational order of the item totalizer has associated therewith a grooved bushing 157, which has secured thereto, adjacent its right-hand end, which is formed as a tens transfer ratchet wheel 259, the driving gear 156. The driving gear 156 meshes with the intermediate wheel 154, and the grooved bushing 157 has a groove 261, in which is slidably mounted a rider 262, mounted within an annular groove in the totalizer line I.

The plus wheel 263 and the minus wheel 264 of each denominational order of the item totalizer are mounted on the grooved bushing 157 and are provided with internal teeth 265 and 266, respectively.

Also mounted on the grooved bushing 157 (FIG. 7), adjacent a hub 270, supporting the minus wheel 264, is a sleeve 271, having a boring in which the rider 262 can move idly when the "Single Item" key is depressed, as will be explained shortly.

The rider 262 is adjustable to three positions by means of the totalizer line I, in the first of which, commencing from the left-hand side in FIG. 7, the rider 262 is in the boring 272, while, in its second and third positions, the rider 262 engages the internal teeth 266 and 265, respectively.

When the "Single Item" key 102 is depressed, a pin 273, secured in its key stem, engages a cam surface 274 of the sector 248 and rocks the latter clockwise. Clockwise movement of the sector 248, through the toothed segment 249, the toothed segment 251, the segment arm 252, and the toothed segment 254, moves the drum cam 253 clockwise, as seen in FIG. 11. Clockwise movement of the drum cam 253, through its groove 256, the roller 258 (FIG. 7), and the arm 257, moves the totalizer line I to the left, as viewed in FIG. 7, to a position in which the rider 262 is located in the boring 272 of the sleeve 271.

As the totalizer-actuating segments 151 and 158 (FIG. 4) remain coupled to each other upon depression of the "Single Item" key 102, both the grooved bushing 157 on line I and the grooved bushing 165 on line II are driven by the totalizer-actuating segments if an amount has been entered into the related denominational order. However, as the rider 262 is located in the boring 272, rotation of the grooved bushing 157 is ineffective to impart movement to either the plus wheel 263 or the minus wheel 264. Therefore, initiation of a machine operation under control of the "Single Item" key 102 is effective to enter a set-up amount only into the totalizer on line II selected by the depressed clerk's key 101.

At the conclusion of a "Single Item" entry, the sector 248 (FIG. 11) remains in the position to which it was set by the depression of the "Single Item" key 102, in which position a cam surface 275 is in the path of movement of the pin 226 in the blind key stem 227 of the "Itemizer" key 106.

When the "Itemizer" key 106 is depressed, its pin 226 engages the cam surface 275 of the sector 248 and rocks the latter counter-clockwise an extent sufficient to cause the rider 262 to be engaged with the internal teeth 265 of the hub 267 supporting the plus wheel 263, through the train of mechanism previously described.

As the totalizer-actuating segments 151 and 158 (FIG. 4) remain coupled to each other upon depression of the "Itemizer" key 106, both the grooved bushing 157 on line I and the grooved bushing 165 on line II are driven by the totalizer-actuating segments if an amount has been entered into the related denominational order. Therefore, the initiation of a machine operation under control of the "Itemizer" key 106 is effective to enter a set-up amount both into the plus wheel 263 on line I and into the selected totalizer wheel 246 on line II.

Referring to FIGS. 7 and 8, the plus wheel 263 of the item totalizer meshes with an intermediate wheel 277 mounted on a shaft 276. The intermediate wheel 277, through a hub 278, is rigidly connected to a further intermediate wheel 279, which meshes with a pinion 280. The pinion 280 is mounted on a stud 281, secured to the totalizer frame 237, and meshes with the minus wheel 264. Consequently, if the plus wheel 263 is driven clockwise (FIG. 8) during the entry of a positive amount, a corresponding counter-clockwise movement is imparted, through the gearing 277—278—279—280, to the minus wheel 264.

If, after the entry of the positive amounts into the item totalizer, it is desired to subtract an amount therefrom, this is effected by depression of the "Subtract" key 103 (FIG. 11).

After the last positive entry, the sector 248 remains in the position to which it was moved by depression of the "Itemizer" key 106 (FIGS. 1, 9, and 10), in which position a cam surface 282 is in the path of movement of a pin 283 secured in the stem of the "Subtract" key 103.

When the "Subtract" key 103 is depressed, the pin 283 engages the cam surface 282 and moves the sector 248 clockwise (FIG. 11) to shift the totalizer line I toward the left, as seen in FIG. 7, to a position in which the rider 262 engages the internal teeth 266 of the hub 270 supporting the minus wheel 264. The shifting of the totalizer line I is effected through the train of mechanism previously described in connection with the "Itemizer" key 106.

As the totalizer-actuating segments 151 and 158 (FIG. 4) are uncoupled by depression of the "Subtract" key 103, only the grooved bushing 157 on totalizer line I is driven by the totalizer-actuating segment 151, if an amount has been entered into the related denominational order.

Rotation of the grooved bushing 157 to the value to be subtracted is imparted additively, through the rider 262, to the minus wheel 264, which, through its gearing 280, 279, and 277, reversely rotates the plus wheel 263 to subtract therefrom the amount added into the minus wheel 264. Thus, the plus wheels 263 contain the total of all the items of a multiple-item transaction, less the amount subtracted therefrom.

When a total or a sub-total is taken from the item totalizer in the manner described hereinafter, the rider 262 (FIG. 7) is engaged with the internal teeth 265 of the hub 267 supporting the plus wheel 263. Therefore, the sector 248 (FIG. 11) is provided with two cam surfaces 284 and 285, which will cause the sector 248 to move the same extent as the cam surface 275, cooperating with the pin 226 of the "Itemizer" key 106.

A pin 286, secured to the stem of the "Total" key 104, cooperates with the cam surface 284, while the cam surface 285 has associated therewith a pin 287, secured to the stem of the "Sub-Total" key 105.

As the cam surfaces 284 and 285 impart a similar degree of movement to the sector 248 as does the cam surface 275, the internal teeth 265 of the hub 267 supporting the plus wheel 263 will be engaged with the rider 262.

The totalizer-actuating segments 151 and 158, as already mentioned, are uncoupled by depression of the keys 104 and 105 during a total-taking operation or during a sub-total-taking operation, so that only the grooved bushing 157 is actuated.

Referring to FIG. 11, the sector 248 has a further cam surface 288 for cooperation with the pin 283 of the "Subtract" key 103. The cam surface 288, after a machine operation has been initiated by the "Single Item" key 102, is positioned in the path of movement of the pin 283 and positions the rider 262 in the subtract position when the first entry of a multiple-item entry, following a single-item entry, is initiated by depression of the "Subtract" key 103.

It is obvious from FIG. 11 that the cam surfaces of the sector 248 associated with the keys 102 to 105, as well as with the key 106, terminate in a notch 289. If any one of the keys 102—106—for instance, the "Subtract" key 103 (FIG. 11)—is in its depressed position, its pin 283 rests in the notch 289 associated therewith and locks the sector 248 against movement. When the sector 248 is locked, the cam surfaces thereof are in the path of movement of the pins secured to the undepressed keys, so that undepressed keys are locked against depression while any one of the keys is depressed. Therefore, as the sector 248 is locked against movement, the totalizer line I also is locked in its moved position.

*Tens Transfer Mechanism for the Item Totalizer*

Referring to FIGS. 7 and 8, a tens transfer pin 290 is secured only to the plus wheels 263 of the item totalizer and cooperates with an operating pawl 291 mounted on a shaft 292 and rigidly connected, through a hub, to a supporting pawl 293. The supporting pawl 293 has two notches, 294 and 295, which support an ear 296 of a tens transfer pawl 297, cooperating with the tens transfer ratchet wheel 259 of the next higher order. The supporting pawl 293 and tens transfer pawl 297 are resiliently connected by a spring 304.

When the tens transfer pawl 297 is in a non-prepared condition, its ear 296 is supported by the notch 294, while the ear is supported by the notch 295 when the tens transfer pawl 297 is in its prepared condition.

The tens transfer pawl 297 is pivoted to a tens transfer lever 299, which normally is held in engagement with a shaft 301 by means of a spring 300. Secured to the downwardly-extending arm of each tens transfer lever 299 is a roller 302, which cooperates with a tens transfer operating cam 303 pinned to the shaft 185.

When the shaft 185 is driven counter-clockwise, the cam 303 engages the roller 302 toward the end of a machine cycle and rocks the tens transfer lever 299 clockwise, whereby an upward movement is imparted to the tens transfer pawl 297.

The upward movement of the tens transfer pawl 297 is ineffective to effect a tens transfer when its ear 296 is supported by the notch 294 of the supporting pawl 293.

However, when the ear 296 is supported by the notch 295 of the supporting pawl 293, the tens transfer pawl 297, upon upward movement, engages the next higher order tens transfer wheel 259 and rotates the latter one step clockwise (FIG. 8) in unison with the grooved bushing 157 (FIG. 7) to enter one unit into the next higher order of the item totalizer.

The direction in which the plus wheel 263 of the next higher order of the item totalizer is driven depends upon whether the rider 262 is in mesh with the internal teeth 265 or 266. During an adding operation, the rider 262, as previously described, engages the internal teeth 265 of the plus wheel 263, so that the latter, when a tens transfer operation is effected, is rotated clockwise one unit. When a subtract operation is performed, the rider 262 engages the internal teeth 266 of the minus wheel 264, so that the latter, when a tens transfer operation is effected, is rotated counter-clockwise one unit.

In order to enable the tens transfer pawl 297 to be supported by the notch 295, clockwise movement of the plus wheel 263 (FIG. 8) as it moves from "9" to "0" in adding operations, or counter-clockwise movement as it moves from "0" to "9" in subtract operations, causes its pin 290 to rock the operating pawl 291 and the connected supporting pawl 293 a distance counter-clockwise sufficient to permit the spring 304 to move the ear 296 of the tens transfer pawl downwardly into the notch 295. Therefore, when the tens transfer pawl 297 is driven as described above, a unit will be entered either additively or subtractively into the next higher order of the item totalizer.

During the operating stroke of the tens transfer pawl 297, it is rocked counter-clockwise by the next tooth of the ratchet wheel 259, against the action of the spring 304, until at the end of its stroke its ear 296 rises above the level of the notch 294 in the supporting pawl 293 to permit the latter, which rotates clockwise with the pawl 297, to re-engage its ear 296 with the notch 294 during return movement of the pawls 297 and 293.

*Tens Transfer Mechanism for the Clerks' Totalizers*

A tens transfer pawl 305 (FIG. 8) cooperates with the tens transfer ratchet wheel 243 secured to the grooved bushing 165, which pawl 305 is secured to a downwardly-extending arm of the tens transfer lever 299. An ear 306 of the pawl 305 is normally supported by one, 307, of two notches 307 and 308 of a supporting pawl 309 associated with the next lower denominational order.

The supporting pawl 309 is mounted on the shaft 162 and has four extensions 310 (only one of which is shown in FIG. 8), each of which is in the path of movement of a tens transfer pin 311, one of which is secured to each of the totalizer wheels 246 (see also FIG. 7). A spring 312 holds the tens transfer pawl 305 in resilient engagement with the supporting pawl 309.

When the tens transfer lever 299 is driven clockwise by the cam 303, as previously described, a leftward movement is imparted to the tens transfer pawl 305, as seen in FIG. 8. When the ear 306 of the pawl 305 is supported by the notch 307 of the pawl 309, as seen in FIG. 8, leftward movement of the pawl 305 is ineffective to impart movement to the ratchet wheel 243.

However, when a totalizer wheel 246 moves from "9" to "0," its tens transfer pin 311 engages the corresponding extension 310 of the supporting pawl 309 and rocks the latter counter-clockwise to enable the spring 312 to move the tens transfer pawl in the next higher denominational order to the prepared position, in which the ear 306 is supported by the notch 308. When leftward movement is now imparted to the tens transfer pawl 305, the latter engages the tens transfer ratchet wheel 243 and rotates the latter clockwise an extent to cause the grooved bushing 165 (FIG. 7), through the rider 245, to impart one unit of movement to the selected totalizer wheel 246.

During the operating stroke of the tens transfer pawl 305, its ear 306 is lowered, against the action of the spring 312, below the level of the notch 307 in the supporting pawl 309 to permit the latter, which rotates clockwise with the pawl 305, to re-engage its ear 306 with the notch 307 during return movement of the pawls 305 and 309.

*Control of Engagement of the Actuators*

As previously described, the shaft 153 carries the totalizer-actuating segments 151 and 158 and is mounted in two rocking arms 207 (only one of which is shown in FIGS. 4, 16, and 17). The rocking arms 207 are rotatably mounted on the shaft 185, and each arm carries a roller 313. Each rocking arm 207 has associated therewith a retracting arm 314, the retracting arms 314 being rigidly connected together by a hub 316 (FIG. 17) mounted on a machine release shaft 315 and each having a cam slot 317 engaging its respective roller 313.

The slots 317 are so formed that counter-clockwise movement is imparted to the rocking arms 207 by a clockwise movement of the retracting arms, so as to engage the totalizer-actuating segments 151 and 158 with the intermediate wheels 154 and 159.

The retracting arm 314 shown in FIGS. 16 and 18 is provided with a slot 318, in which a pin 319 is slidably mounted by means of a disc on each side of the arm 314 and secured to the pin 319. One end of the pin 319 projects into a cam slot 320 in a mode of operation selecting segment 321, and the other end projects into control slots 322 and 323, formed, respectively, in control levers 324 and 325. The shape of the control slots 322 and 323 is clearly illustrated in FIG. 18. A spring 326, 327 engages a downwardly-extending arm of each of the control levers 324 and 325, respectively, as seen in FIGS. 16 and 17, and tends to rock each control lever 324 and 325 counter-clockwise as seen in FIG. 16, to engage rollers 328 and 329 (FIG. 17) with their respective cams 330 and 331, pinned to the shaft 185.

The mode of operation selecting segment 321 is mounted on the machine release shaft 315 and, through a hub 332 (FIG. 17) is rigidly connected to a pinion 333. A toothed segment 334 (FIG. 16) meshes with the pinion 333 and is formed on a downwardly-extending arm 335 of a mode of operation control sector 336 mounted on the machine main shaft 110 for operation under control of the control keys.

The mode of operation control sector 336 is provided with a plurality of cam surfaces for cooperation with the pins secured in the stems of the control keys 102–106.

Assuming that the "Total" key 104 is depressed to initiate a machine operation, the pin 286 secured to its stem, through engagement with either of the cam surfaces 337 or 338, moves the operation control sector 336 either clockwise or counter-clockwise to the position shown in FIG. 16. Such movement of the sector 336 under control of the "Total" key 104, through the lever 325, the toothed segment 334, the pinion 333, and the cam slot 320 in the selecting segment 321, positions the pin 319 in the central position of the slots 318, 322, and 323. In this position, the pin 319 lies in the substantially horizontal branch of the control slot 322 of the lever 324 and above a vertical branch of the control slot 323 in the lever 325.

Therefore, at the commencement of the machine operation, the control lever 324 is rocked clockwise by the total-taking cam 330 as the shaft 185 is driven counter-clockwise. Clockwise movement of the control lever 324, through the pin 319 and the slots 318 and 323, imparts a corresponding movement to the retracting arms 314 and to the control lever 325, respectively. Clockwise movement of the retracting arms 314 imparts a counter-clockwise movement to the rocking arms 207, so as to engage the totalizer-actuating segments 151 and 158 with the intermediate wheels 154 and 159 just prior to movement of the setting members; i.e., in total-taking timing. It will be remembered, however, that the actuating segment 158 is not coupled to the actuating segment 151 upon depression of the "Total" key 104, and, therefore, only the intermediate wheel 154 will be actuated.

The cam 330 is so formed that the control lever 324 tends to be rocked counter-clockwise by its spring 326 as soon as the roller 328 leaves its high periphery. However, at the instant the roller 328 leaves the high periphery of the cam 330, the roller 329 on the control lever 325 is engaged by the add cam 331 and rocked clockwise, but this movement is ineffective to prevent counter-clockwise movement of the control lever 324 and the retracting arms 314 as the pin 319 enters the horizontal branch of the slot 323.

The totalizer-actuating segments 151 and 158 are, therefore, engaged with, and disengaged from, the intermediate wheels in total-taking timing.

When any one of the keys 102, 103, or 106 is depressed, the totalizer-actuating segments 151 and 158 are engaged with the intermediate wheels in add timing, as will now be explained.

The pins 273, 283, and 226 in the stems of the keys 102, 103, and 106 cooperate, respectively, with similar cam surfaces 339, 340, and 341 provided on the mode of operation control sector 336.

If the sector 336 is in the position shown in FIG. 16, depression of a key 102, 103, or 106 causes its pin 273, 283, or 226, respectively, to engage a cam surface 339, 340, or 341 to shift the sector 336 counter-clockwise. Counter-clockwise movement of the sector 336 causes the mode of operation selecting segment 321 to be rocked clockwise, over the train of mechanism previously described, to cause its cam slot 320 to position the pin 319 at the left-hand end of the slots 318, 322, and 323. In this position, the pin 319 lies in the horizontal branches of the slots 318 and 323 and above the vertical branch of the slot 322.

At the commencement of the machine operation, the control lever 324 is given a clockwise idle movement by the total-taking cam 330, as the pin 319 is above the vertical branch of the slot 322 in this control lever. However, as soon as the add cam 331 rocks the control lever 325 clockwise, the pin 319, which is engaged in the horizontal branches of the slots 323 and 318, causes the retracting arms 314 also to rock clockwise, whereby the rocking arms 207 engage the totalizer-actuating segments 151 and 158 with the intermediate wheels 154 and 159, respectively.

It should be noted that, although the pin 319 also causes the control lever 324, to be rocked clockwise when the control lever 325 is rocked clockwise by the add cam 331, this movement is merely a duplication of the movement of the control lever 325 and has no effect on the timing of engagement of the totalizer-actuating segments 151 and 158.

When the high portion of the cam 331 moves away from beneath the roller 329 of the control lever 325, the springs 326 and 327 urge the control levers 324 and 325 counter-clockwise to restore the displaced parts to their normal positions.

Assuming that the next operation to be effected is a sub-total-taking operation, under control of the "Sub-Total" key 105, the pin 287 (FIG. 16), secured to its key stem, engages a cam surface 342 of the sector 336 and rocks the latter clockwise to impart counter-clockwise movement to the mode of operation selecting segment 321. Due to the shape of the cam slot 320, the mode of operation selecting segment 321 moves the pin 319 to the right-hand portion of the slots 318, 322, and 323 (FIG. 18) of the retracting arm 314 and the control levers 324 and 325, respectively. In this position, the pin 319 rests in a horizontal branch of all of these slots.

Clockwise movement imparted to the control lever 324 by the total-taking cam 330 is transferred, via the pin 319, to the retracting arms 314 and to the control lever 325, so as to cause the totalizer-actuating segments 151 and 158 to be engaged, as previously described, with the intermediate wheels 154 and 159. As soon as the high surface of the total-taking cam 330 passes from beneath the roller 328 of the control lever 324, the high surface of the add cam 331 comes beneath the roller 329 of the control lever 325, thereby maintaining the totalizer-actuating segments 151 and 158 in engagement with the intermediate wheels 154 and 159 in sub-total-taking timing.

*Control of the Amount-Setting Members From the Item Totalizer During Total-Taking and Sub-Total-Taking Operations*

In view of the fact that the machine chosen to illustrate the present invention is provided with complementarily settable setting members, during total-taking and sub-total-taking operations its counting members should first of all be positioned according to the total standing in the item totalizer, prior to movement of the complementary members.

Therefore, the zero stop pawls must be rocked out of the path of movement of the counting members immediately after the commencement of a sub-total-taking operation or a total-taking operation, in order that the counting members can start their setting movement, and the mechanism for accomplishing this will now be described in connection with FIGS. 5 and 19.

Each denominational order of the item totalizer has a feeler plate 268 mounted on a hub 267 (see FIG. 7) carrying the plus wheel 263, which plate 268 cooperates with a feeler 269 mounted on the shaft 276. Each feeler plate 268 (FIG. 19) has a notch 343 in the path of movement of an extension 344 provided on its associated feeler 269 when the corresponding plus wheel 263 is in its zero position.

Pinned to the shaft 276, adjacent each feeler 269, is an arm 345 engaging a pin 346 secured in its associated feeler 269. Pinned to the left-hand end of the shaft 276 is a total-taking release lever 347, the upper end of which embraces an ear 348 of the detent 168 (FIG. 5). Rotatably secured to the lower end of the total-taking release lever 347, and bearing upon a cam 350 pinned to the shaft 185, is a roller 349.

Each feeler 269 has one end of a spring 351, wound around the shaft 276, constantly urging it counter-clockwise, the other end of the spring 351 engaging a fixed bolt 352. However, in the normal position of the parts as shown in FIG. 19, counter-clockwise movement of the feelers 269 is prevented by the arms 345 engaging the pins 346.

On the right-hand end of each feeler 269 is an ear 353, which is movable into the path of movement of a pin 354 secured in each complementary member 112 (see also FIG. 2A).

Referring to FIG. 5, an arm 355 is secured to the shaft 276, which arm, via a link 356, is connected to an arm 358 pinned to the shaft 222.

When the detent 168 is in its normal position, its ear 348 prevents counter-clockwise movement of the total-taking release lever 347 under the influence of a spring (not shown) when the cam 350 is rotated counter-clockwise during a machine operation.

However, initiation of a machine operation by depression of either the "Total" key 104 or the "Sub-Total" key 105 moves the detent 168 downwardly, moving the ear 348 out of cooperation with the total-taking release lever 347. After initial counter-clockwise rotation of the cam 350, the total-taking release lever 347 is rocked, together with the shaft 276, counter-clockwise under the action of its spring (not shown). Counter-clockwise movement of the shaft 276 moves the link 356 (FIG. 5) upwardly to rock the shaft 222 and the arms 359 secured thereto clockwise. Clockwise movement of the arms 359, through the pins 360, moves the zero stop pawls 124 (FIG. 2A) out of the path of movement of the amount differential members 111, so that the latter are free to be driven an extent corresponding to the amount contained in the item totalizer.

Counter-clockwise movement of the shaft 276 also moves the arms 345 (FIG. 19) counter-clockwise to enable the springs 351 to urge the feelers 269 in the same direction.

When a plus wheel 263 is in its "0" position, the notch 343 of the associated feeler plate 268 is in the path of movement of the extension 344 on the feeler 269, permitting the feeler 269 to move counter-clockwise an extent to position the ear 353 as shown in the upper dotted line position of FIG. 19. The amount differential member 111 (FIGS. 2A and 2B) is held in its zero position by its connection, through the engaged totalizer-actuating segment 151, to the plus totalizer wheel 263, and the complementary member 112 is free to effect a complementary movement.

If a plus wheel 263 contains a value (for instance, the value "9"), the notch 343 will be positioned as shown in FIG. 19. When the feeler 269 carries out its counter-clockwise movement, the extension 344 engages the outer diameter of the feeler plate 268 and positions the ear 353 to the central position, shown in dot-and-dash lines in FIG. 19, in which position it engages the pin 354 in the complementary member 112 to prevent movement of the latter.

When the setting members are driven, the amount differential member 111 (FIGS. 2A and 2B) is free to move until it is arrested, through the engaged totalizer-actuating segment 151, by engagement of the feeler member 269 in the notch 343 of the feeler plate 268. Entry of the feeler member 269 into the notch 343 permits its ear 353 to move to its upper dot-and-dash position shown in FIG. 19, in which position the complementary member 112 is freed for movement complementary to that of the amount differential member 111. The previous restriction against movement of the complementary member 112, through the positioning of feeler plate ear 353 behind pin 354 thereof, overcomes any tendency of such member 112 to rock the gear segment 139 prior to totalizer controlled arrestment of the amount differential member 111, which member 111, during total taking and sub-total taking machine operations, determines the new position at which the segment 139 is to be set. Since such segment 139 is not affected by the earlier-described restoration to the home of the setting members 111 and 112—that is, remains in its previously set position, it may be left, in view of the previous machine operation, at a set position higher in number than that of its related totalizer wheel, which wheel determines, as just described, the setting of the amount differential member 111. Thus, without such restriction, initial movement of the complementary member 112 may cause the gear segment 139 to be first rocked a distance clockwise, until the upper rear edge thereof contacts the pin 142, whereupon such segment 139 must then be returned counter-clockwise as the amount differential member 111 moves toward its new position. This, in view of the above-described interconnection with such gear segment 139, causes an undesired movement (first one way and then the other way) to be imparted to both the associated indicator drum 148 and printing mechanism type wheel, as they are set to such new position. With such restriction of the complementary member 112, the gear segment 139, indicator drum 148, and printer mechanism type wheel are assured of being moved, from their last set positions, directly to the new positions.

*Interlock Between the "Single-Item" Key and the "Itemizer" Key*

During multiple-item-entering operations, it is desirable that the "Single Item" key 102 be locked against depression, and, during single-item-entering operations, it is desirable that the "Itemizer" key 106 be locked against depression. The mechanism for accomplishing this interlock is shown in FIG. 20 and will now be described.

Mounted on the machine main shaft 110 (FIG. 20) is a sector 361, having two cam surfaces 362 and 363 and a blocking surface 364. A spring 365 is connected between the sector 361 and the machine framework, so as to urge the sector 361 clockwise.

When the sector 361 is in its normal, clockwise, position, the cam surface 362 is in the path of movement of the pin 283 in the stem of the "Subtract" key 103, the cam surface 363 is in the path of movement of the pin 226 in the blind key stem operated by the "Itemizer" key 106, and the blocking surface 364 is out of the path of movement of the pin 273 in the stem of the "Single Item" key 102.

Therefore, the "Single Item" key 102 can be depressed to initiate single-item entry operations.

Secured to the key frame of the row of control keys is a bolt 366, on which is pivotally mounted a lever 367 rigidly connected to an arm 369 also pivoted on the bolt 366. A spring 368, connected to the lever 367, urges the lever 367 and the arm 369 counter-clockwise to maintain a pin 370 in the lever 367 beneath an extension 371 of the sector 361, and also to maintain an ear 372 of the arm 369 beneath a cam segment 373 secured to a gear 374 pinned to the machine main shaft 110.

When either the "Subtract" key 103 or the "Itemizer" key 106 is depressed, the corresponding pins 283 and 226 engage, respectively, the cam surfaces 362 or 363 of the sector 361 and rock the latter, against the urge of the spring 365, counter-clockwise to position the blocking surface 364 beneath the pin 273 of the "Single Item" key 102 to block the latter against depression.

During counter-clockwise movement of the sector 361, the extension 371 passes beyond the pin 370, thereby permitting the lever 367 and the arm 369 to rock counter-clockwise under the urge of the spring 368 as soon as the cam segment 373 moves away from the rear 372 upon counter-clockwise movement of the gear 374. Counter-clockwise movement of the lever 367 is limited by engagement of its end with the pin 286 secured to the stem of the "Total" key 104. In this position, the pin 370 in the lever 367 retains the sector 361 against return clockwise movement, so that the blocking surface remains beneath the pin 273 of the "Single Item" key 102, the cam segment 373 passing beneath the ear 372 during subsequent machine operations initiated by the "Subtract" key 103 or the "Itemizer" key 106.

When the "Total" key 104 is depressed to conclude the entry of a series of multiple items, its pin 286 rocks the lever 367 and the arm 369 clockwise to position the pin 370 in the central dot-and-dash line position shown in FIG. 20, in which position the "Single Item" key 102 remains blocked by the blocking surface 364. However, prior to the conclusion of machine operations initiated by the "Total" key 104, the cam segment 373 contacts the ear 372 to rock the arm 369 and the lever 367 farther clockwise to position the pin 370 in the lower dot-and-dash position shown in FIG. 20, and in this position the sector 361 is free to move clockwise under the influence of its spring 365, which restores the sector to its normal position, in which the lever 367 is maintained out of the path of the pin 286 in the "Total" key 104.

*Interlock Between the Total-Taking Keys and the Amount Keys*

An interlock is provided to prevent depression of the amount keys 100 (FIGS. 1, 2A, and 21) when either the "Total" key 104 or the "Sub-Total" key 105 is depressed, and vice versa. This interlock is shown in FIGS. 5, 20, and 21 and will now be described.

Referring to FIG. 5, the detent 168 has an extension 375 for cooperation with an arm 376 of a yoke 377 mounted on the shaft 180. The yoke 377 extends across the entire machine and has a plurality of slots 378 (FIG. 21), into which project extensions 379 of locking levers 380, a locking lever 380 being provided for each row of amount keys 100.

Secured to the lower portion of each of the detents 127 (FIGS. 2A and 21) is a pin 381, which cooperates with its associated locking lever 380.

Referring to FIG. 21, the yoke 377 has a second arm 382, which is connected by a pin-and-slot connection 383, 384 to a sector 385 associated with the row of control keys. The sector 385 is mounted on the machine main shaft 110 and has five extensions 386–390 for cooperation with the pins 273, 283, 226, 286, and 287, respectively, in the control keys.

Upon downward movement of the detent 168 upon depression of either the "Total" key 104 or the "Sub-Total" key 105, the extension 375 engages the arm 376 of the yoke 377 and rocks the latter counter-clockwise, as seen in FIGS. 5 and 21, so that the locking levers 380 (FIG. 21) move into the path of movement of the pins 381 in the detents 127. Therefore, the detents 127 are blocked against downward movement, and the amount keys 100 cannot be depressed.

Vice versa, if an amount key 100 (FIG. 21) is depressed in any one of the rows of amount keys, the corresponding detent 127 moves downwardly, and its pin 381 is moved into the path of movement of the associated locking lever 380. Therefore, the locking levers 380 cannot be rocked counter-clockwise (FIG. 21), thereby preventing depression of the "Total" key 104 and the "Sub-Total" key 105.

The counter-clockwise movement imparted to the yoke 37 (FIG. 21) by depression of either the key 104 or the key 105 is transmitted, via the yoke arm 382, to the sector 385 associated with the row of control keys, so that the control keys 102, 103, 105, and 106 are locked against depression by the extensions 386, 387, 388, and 390, respectively, if the "Total" key 104 is depressed, or the control keys 102, 103, 104, and 106 are locked against depression by the extensions 386, 387, 388, and 389 if the "Sub-Total" key 105 is depressed.

*Enforced Depression of a Clerk's Key Before Machine Release*

The mechanism to enforce the depression of a clerk's key 101 (FIGS. 1 and 12), prior to release of the machine for a cycle of operation, is shown in FIG. 12 and will now be described.

An arm 391 (FIG. 12) is pinned to the shaft 180 and cooperates with a surface 395 of a detent 392 associated with the bank of clerks' keys 101. The detent 392 has four notches 393 for cooperation with pins 394 secured to the clerks' keys 101.

Pinned to the shaft 180 is a further arm 396, which, via a link 397, is connected to a machine release segment (not shown). In order to release the machine, the machine release segment must be free to move the arm 396, the shaft 180, and the arm 391 clockwise, via the link 397.

If no one of the clerks' keys 101 be depressed, a clockwise movement of the arm 391 is prevented by the surface 395 of the detent 392, thereby preventing the required releasing movement of the machine release segment.

If a clerk's key 101 is depressed, its pin 394 enters the corresponding notch 393 and cams the detent 392 upwardly to move the surface 395 thereon out of the path of movement of the arm 391. Therefore, the arms 391 and 396 can move clockwise, and the machine release segment connected to the arm 396, via the link 397, performs a corresponding movement to permit the initiation of a machine operation.

The detent 392 is normally in the position shown in FIG. 12 but, after depression of any one of the clerks' keys 101, is retained in its upper moved position, thereby to retain the depressed clerk's key 101 in depressed position, by an S-shaped pawl 398. The pawl 398 is pivotally mounted on the key frame of the clerks' key bank and is spring-urged counter-clockwise to tend to engage an ear on its lower end with an extension 402 of the detent 392. Upon depression of a clerk's key 101, the detent 392 is cammed upwardly, as previously explained, and the ear of the pawl 398 engages and retains the detent in its upper position, thereby retaining the depressed clerk's key in depressed position.

A releasing mechanism, known per se, is provided to release the detent 392 and to permit restoration of the depressed clerk's key 101.

The releasing mechanism is operated by depression of the "Single-Item" key 102, the "Total" key 104, or the "Sub-Total" key 105 and rocks a shaft 400, to which is pinned a release lever 399, clockwise. Clockwise movement of the release lever 399 engages a pin 401, secured in the pawl 398, and rocks the latter clockwise to release its ear from the extension 402. Thereafter, the restoring spring on the depressed clerk's key 101 cams the detent 392 downwardly to its normal position.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A cash register or similar accounting machine adapted for the entry of single items and a series of items comprising a multiple item entry, including a plurality of banks of amount keys; control keys; an item totalizer including accumulating wheels; a group totalizer; two sets of actuators, including a first set cooperating with said item totalizer and a second set cooperating with said group totalizer; a coupling mechanism for coupling the two sets of actuators together for simultaneous operation; a coupling control mechanism controlled by said control keys; a differential mechanism comprising a first and a second setting member, each being settable under control of the amount keys; said first setting member being directly connected to the first set of actuators; a holding mechanism for said second setting member, being operated under control of certain ones of the control keys; zero stops for said banks of amount keys; and a zero stop release mechanism being operated under control of said certain ones of the control keys; the depression of one of said certain ones of the control keys being effective to release said zero stops and permit said first setting member to rotate said accumulating wheels of the item totalizer to zero position, during which the holding mechanism is rendered effective to restrain said second setting member against movement until the accumulating wheels have been so set to zero; said holding mechanism including a feeler arm permitted to cooperate with a peripheral surface of each accumulating wheel when said one of the control keys is depressed, said wheel surface having a notch therein in zero position, said feeler arm sensing said wheel surface upon rotation thereof, and said feeler arm cooperating with the second setting member so as to hold said member while the peripheral surface is sensed, then moving out of cooperative relationship therewith and releasing said member for complementary setting movement when the feeler arm cooperates with said notch.

2. The structure of claim 1 in which said coupling mechanism comprises a coupling member swingably mounted on each actuator of said second set and yieldingly urged into a coupling position with the associated actuator of the first set; and said coupling control mechanism includes a disabling pawl for moving each coupling member to an uncoupling position with the associated actuator of the first set, each pawl being secured to a rockable shaft, and said shaft having a recessed area along its peripheral surface; the coupling members being normally latched in their coupling positions by the peripheral surface of said shaft lying adjacent thereto, whereas, upon depression of said one of the control keys, said shaft is rocked to present the recessed area adjacent said coupling members, thereby unlatching same, and the disabling pawls in engagement with said coupling members, thereby moving them to uncoupling positions.

References Cited in the file of this patent

UNITED STATES PATENTS

| | | |
|---|---|---|
| 1,608,145 | Tingley | Nov. 23, 1926 |
| 2,048,060 | Dicke | July 21, 1936 |
| 2,119,841 | Breitling | June 7, 1938 |